(12) United States Patent
Shchur et al.

(10) Patent No.: US 10,684,675 B2
(45) Date of Patent: Jun. 16, 2020

(54) METHOD AND APPARATUS USING FRICTIONAL SOUND

(71) Applicant: Samsung Electronics Co., Ltd., Suwon-si, Gyeonggi-do (KR)

(72) Inventors: Oleksandr Shchur, Kyiv (UA); Yevhenii Yakishyn, Kyiv (UA); Byeong-hoon Kwak, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/780,789

(22) PCT Filed: Nov. 7, 2016

(86) PCT No.: PCT/KR2016/012735
§ 371 (c)(1),
(2) Date: Jun. 1, 2018

(87) PCT Pub. No.: WO2017/095033
PCT Pub. Date: Jun. 8, 2017

(65) Prior Publication Data
US 2018/0348853 A1 Dec. 6, 2018

(30) Foreign Application Priority Data

Dec. 1, 2015 (KR) .......................... 10-2015-0170082

(51) Int. Cl.
*G06F 3/01* (2006.01)
*G06F 3/16* (2006.01)
(Continued)

(52) U.S. Cl.
CPC ................ *G06F 3/011* (2013.01); *G06F 3/01* (2013.01); *G06F 3/017* (2013.01); *G06F 3/0346* (2013.01);
(Continued)

(58) Field of Classification Search
CPC .......... G06F 1/163; G06F 3/017; G06F 21/32; G04G 21/04
(Continued)

(56) References Cited

U.S. PATENT DOCUMENTS 9,811,648 B2    11/2017   Choi et al.
2005/0207599 A1*  9/2005   Fukumoto ............... G06F 1/163
                                                         381/151
(Continued)

FOREIGN PATENT DOCUMENTS

CN      103105945 A      5/2013
JP      2001-318691 A   11/2001
(Continued)

OTHER PUBLICATIONS

Yotaro Kubo et al.; Noisy Speech Recognition Using Temporal AM-FM Combination; Acoustics Speech, and Signal Processing; May 2008.
(Continued)

*Primary Examiner* — Abdul-Samad A Adediran
(74) *Attorney, Agent, or Firm* — Jefferson IP Law, LLP

(57) ABSTRACT

The apparatus, for using a frictional sound input, includes a microphone configured to receive an audio signal; and a processor configured to detect frictional sound from the audio signal, determine a frictional property by analyzing a characteristic of the detected frictional sound, and execute a control command corresponding to the frictional property.

14 Claims, 37 Drawing Sheets

(51) Int. Cl.
  *G06F 3/0346* (2013.01)
  *G06F 3/041* (2006.01)
  *G06F 3/0488* (2013.01)
  *G06K 9/00* (2006.01)
  *G06F 21/32* (2013.01)

(52) U.S. Cl.
  CPC ........ *G06F 3/0416* (2013.01); *G06F 3/04883* (2013.01); *G06F 3/16* (2013.01); *G06F 21/32* (2013.01); *G06K 9/00* (2013.01); *G06K 9/00006* (2013.01)

(58) Field of Classification Search
  USPC .................... 345/156, 157; 381/151; 726/19
  See application file for complete search history.

(56) References Cited

U.S. PATENT DOCUMENTS

| | | | |
|---|---|---|---|
| 2006/0067164 A1 | 3/2006 | Takai et al. | |
| 2010/0066664 A1 | 3/2010 | Son et al. | |
| 2010/0289740 A1* | 11/2010 | Kim | G04G 21/04 345/157 |
| 2011/0096036 A1 | 4/2011 | McIntosh et al. | |
| 2013/0033388 A1 | 2/2013 | Jain et al. | |
| 2014/0139422 A1 | 5/2014 | Mistry et al. | |
| 2015/0088518 A1 | 3/2015 | Kim et al. | |
| 2015/0277743 A1 | 10/2015 | Isherwood | |
| 2015/0278498 A1 | 10/2015 | Hong et al. | |
| 2016/0103495 A1* | 4/2016 | Takatsuka | G06F 3/017 345/156 |
| 2016/0378193 A1* | 12/2016 | Camacho Perez | G06F 3/017 345/156 |
| 2017/0235935 A1* | 8/2017 | Song | G06F 21/32 726/19 |

FOREIGN PATENT DOCUMENTS

| | | |
|---|---|---|
| JP | 2007-109027 A | 4/2007 |
| JP | 2013-073254 A | 4/2013 |
| KR | 10-2014-0106715 A | 9/2014 |
| KR | 10-2015-0029105 A | 3/2015 |
| KR | 10-1553484 B1 | 9/2015 |
| KR | 10-2015-0096829 | 3/2016 |
| TW | 201415330 A | 4/2014 |

OTHER PUBLICATIONS

International Search Report dated Feb. 8, 2017, issued in International Application No. PCT/KR2016/012735.
Extended European Search Report dated Sep. 11, 2018, issued in European Application No. 16870929.3-1216/3361351.

* cited by examiner

FIG. 2

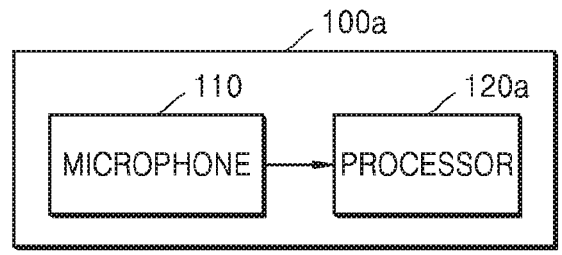

FIG. 3

| APPARATUS | FRICTION PROPERTY | | | CONTROL COMMAND |
|---|---|---|---|---|
| | FREQUENCY CHARACTERISTIC | NUMBER OF FRICTIONS | FRICTION DIRECTION | |
| TEMPERATURE CONTROLLER | (302) | TWICE | DOWNWARDS | UNLOCK |
| | (304) | ONCE | UPWARDS | TEMPERATURE INCREASE |
| | (306) | ONCE | DOWNWARDS | TEMPERATURE DECREASE |

FIG. 4

| APPARATUS | FRICTION PROPERTY | | | CONTROL COMMAND |
|---|---|---|---|---|
| | FREQUENCY CHARACTERISTIC | NUMBER OF FRICTIONS | FRICTION DIRECTION | |
| DRAWER LOCK DEVICE | (402) (404) | TWICE ONCE | DOWNWARDS | Lock / Unlock |
| | (406) | ONCE | DIRECTION FROM WRIST TO FINGERTIP | SET NOTIFICATION MODE |
| | (408) | ONCE | DIRECTION FROM FINGERTIP TO WRIST | RELEASE NOTIFICATION MODE |

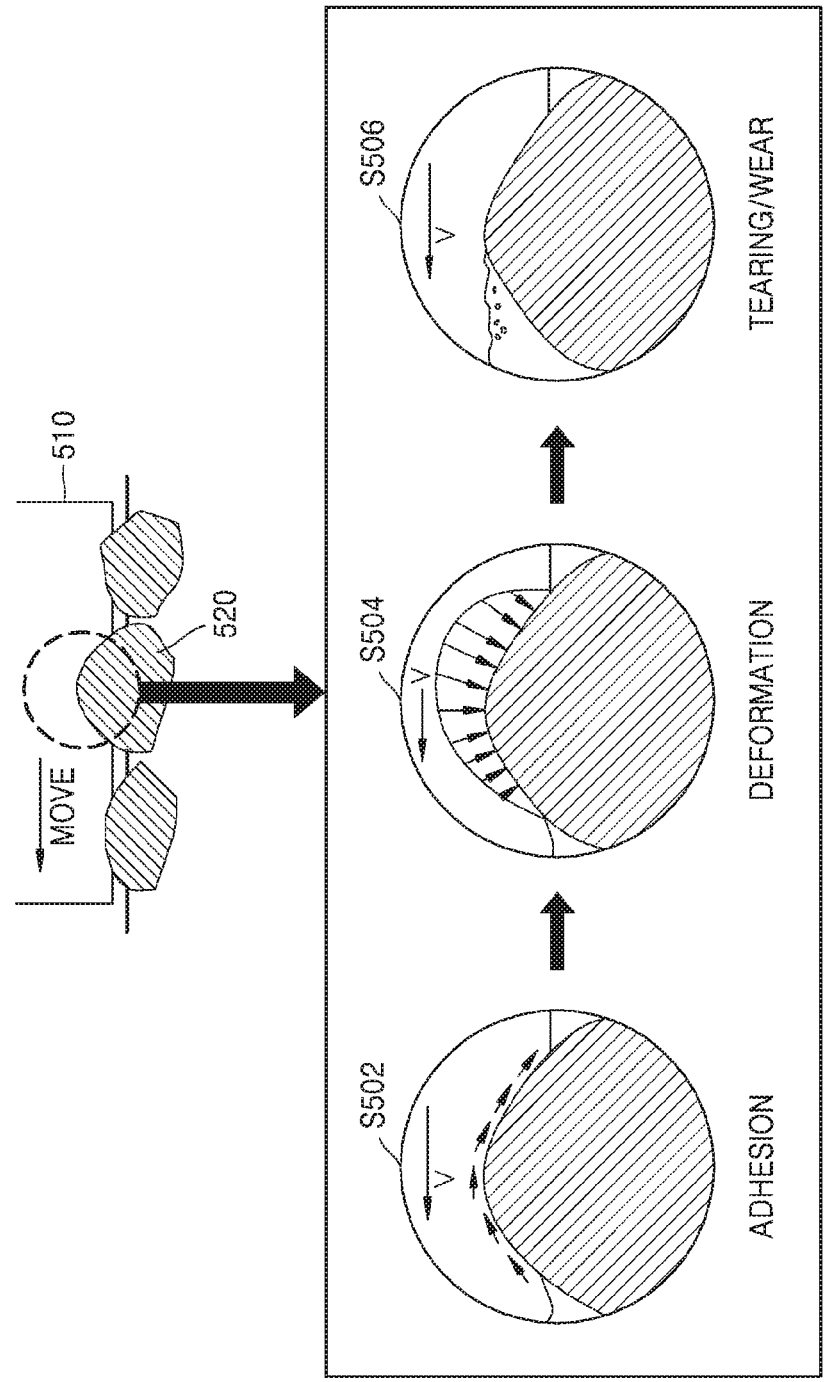

FIG. 7
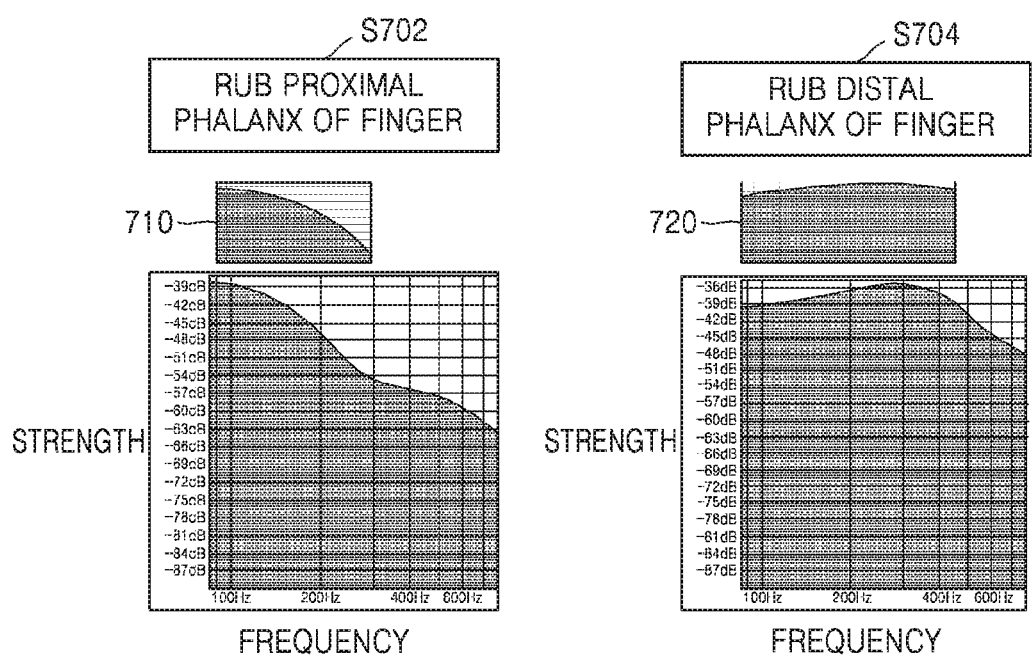
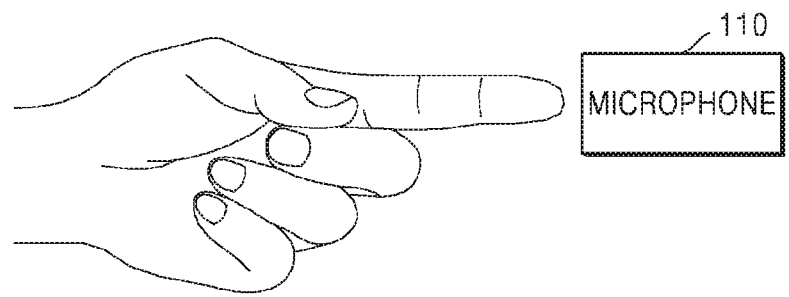

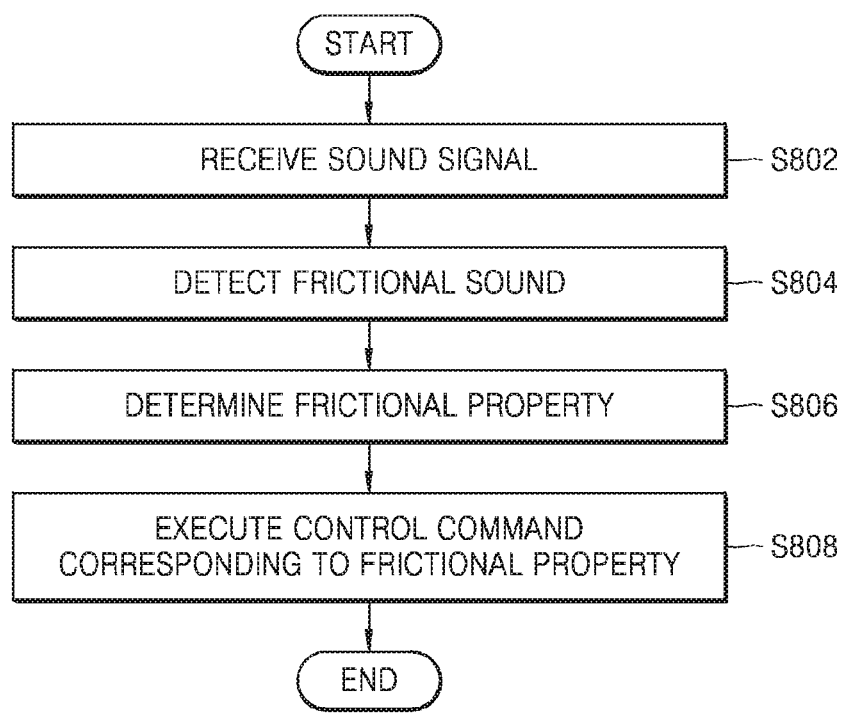
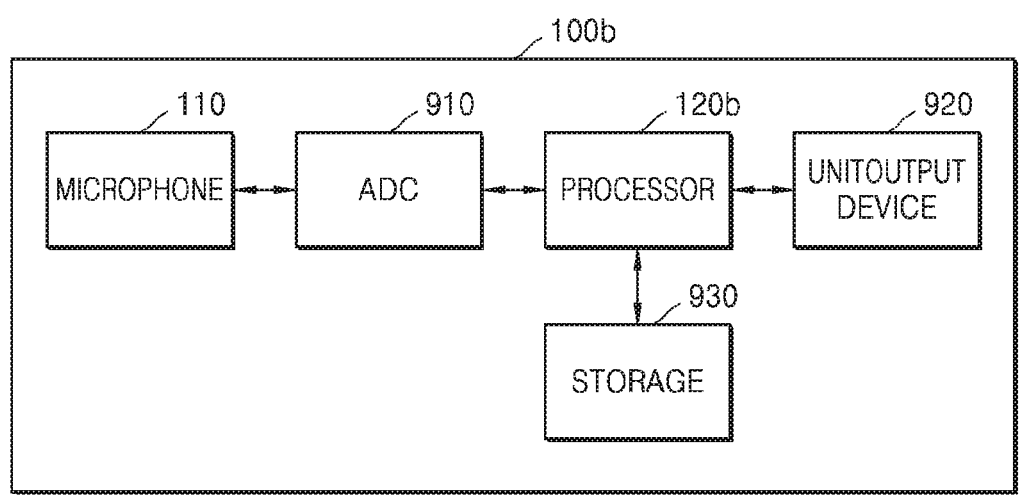

FIG. 10

| ERROR RATE ACCORDING TO EXTERNAL NOISE AND DISTANCE FROM ELECTRONIC APPARATUS | | | |
|---|---|---|---|
| EXTERNAL NOISE(dB) \ DISTANCE FROM ELECTRONIC APPARATUS | CONTACT | 1cm | 2cm |
| 10 | 5% | 5% | 10% |
| 20 | 5% | 30% | 40% |
| 30 | 5% | 50% | 90% |
| 40 | 5% | 90% | >90% |
| 60 | 5% | >90% | >90% |
| 70 | 5% | >90% | >90% |

FIG. 12
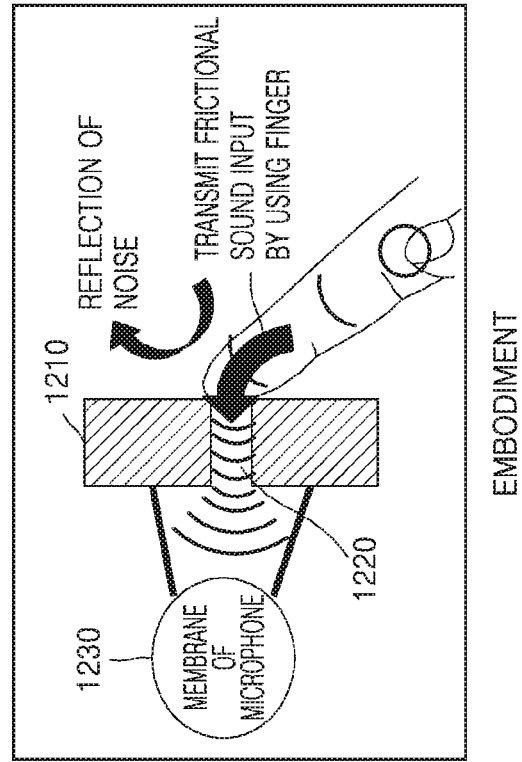
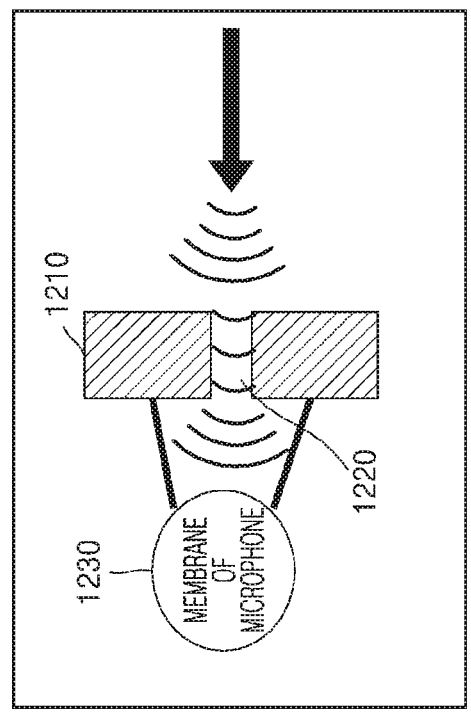

FIG. 15

| | TAP | DOUBLE TAP | LEFTWARD DRAGGING | RIGHTWARD DRAGGING | PINCH (ZOOM OUT) | PINCH (ZOOM IN) | TOUCH-HOLD | TOUCH-HOLD-MOVE |
|---|---|---|---|---|---|---|---|---|
| TOUCH INPUT | | | | | | | | |
| FRICTIONAL SOUND INPUT | 1x | 2x | | | | | 3x | 3x + |

METHOD AND APPARATUS USING FRICTIONAL SOUND

TECHNICAL FIELD

The present disclosure relates to an electronic apparatus using frictional sound, a method of controlling the same, and a non-transitory computer-readable recording medium having recorded thereon a program code for executing the method of controlling the electronic apparatus.

BACKGROUND ART

Various types of electronic apparatuses such as smart phones, smart watches, and smart glasses have been recently developed. Moreover, due to the emergence of the Internet of Things (IoT), home appliances, wearable devices, etc. include a variety of input devices such as key buttons, touch screens, and touch pads. However, as electronic apparatuses decrease in size, limitations on space where input devices can be arranged increase. In addition, there is the demand for types of inputs that are capable of easily interacting with electronic apparatuses without requiring a user's attention.

Thus, sound inputs, gesture inputs, and the like may be used in addition to existing keyboard inputs, touch inputs, etc. However, since the sound inputs are vulnerable to ambient noise and may be heard by other people, the sound inputs may be illegally used. Other electronic apparatuses may react to the sound inputs instead of an electronic apparatus that a user may intend to manipulate.

Since the gesture inputs may be easily viewed by other people, the gesture inputs may be illegally used. Also, expensive sensors are required to detect the gesture inputs.

For user authentication, various types of inputs such as password inputs, gesture inputs, and biometric signals are used on electronic apparatuses. However, the password inputs and the gesture inputs may be easily used by other people. The biometric signals are inputs using biometric signals extracted from, for example, DNA, ear structures, irises, retinas, face recognition, fingerprints, finger structures, hand structures, a gait, odors, veins, voice, and the like. Such biometric signals are less likely to be used by other people, and even if they are stolen, it is impossible to change them.

DESCRIPTION OF EMBODIMENTS

Technical Problem

One or more embodiments are intended to provide input signals that a user may naturally input to an electronic apparatus.

Also, one or more embodiments are intended to provide input signals that are difficult to be illegally used by other people.

Also, one or more embodiments are intended to provide input signals capable of being implemented at low cost by using a microphone that is relatively cheap and provide input signals that are sound inputs and robust to noise.

Also, one or more embodiments are intended to provide input signals that are easily changed by a user and have a large number of cases.

Solution to Problem

According to an aspect of the present disclosure, there is provided an electronic apparatus including: a microphone configured to receive an audio signal; and a processor configured to detect frictional sound from the audio signal, determine a frictional property by analyzing a characteristic of the detected frictional sound, and execute a control command corresponding to the frictional property.

The processor may be further configured to detect the frictional sound based on a change in amplitude of the audio signal.

The electronic apparatus may further include a storage storing a control list of control commands according to frictional properties. The processor may be further configured to select the control command corresponding to the frictional property, from the control list.

The processor may be further configured to determine the frictional property, based on a frequency distribution of the frictional sound.

The frictional sound may be generated when the electronic apparatus contacts a body part.

The electronic apparatus may further include a motion sensor configured to detect a motion. The processor may be further configured to detect a motion of the electronic apparatus, based on a detection value of the motion sensor, and execute an operation corresponding to a combination of the detected motion with the frictional sound.

The processor may be further configured to determine the frictional property, based on data that is within a frequency range from about 20 Hz to about 20 KHz.

The processor may be further configured to perform user authentication by using the frictional sound.

The electronic apparatus may further include an electromyogram sensor configured to detect a movement of a muscle. The processor may be further configured to determine the movement of the muscle, based on a detection value of the electromyogram sensor, and execute a control command corresponding to a combination of the determined movement of the muscle with the frictional sound.

The electronic apparatus may further include a fingerprint sensor configured to detect a fingerprint. The processor may be further configured to execute a control command corresponding to a combination of the detected fingerprint with the frictional sound.

According to another aspect of the present disclosure, there is provided a method of controlling an electronic apparatus, the method including: receiving an audio signal; detecting frictional sound from the audio signal; determining a frictional property by analyzing a characteristic of the detected frictional sound; and executing a control command corresponding to the frictional property.

The detecting of the frictional sound may include detecting the frictional sound based on a change in amplitude of the audio signal.

The method may further include selecting the control command corresponding to the determined frictional property, from a control list of control commands according to frictional properties.

The determining of the frictional property may include determining the frictional property, based on a frequency distribution of the frictional sound.

The frictional sound may be generated while the electronic apparatus is in contact with a body part.

The method may further include detecting a movement of the electronic apparatus, and in the executing of the control command, a control command corresponding to a combination of the detected movement and the frictional sound may be executed.

The determining of the frictional property may include determining the frictional property based on data that is within a frequency range from about 20 Hz to about 20 KHz.

The executing of the control command may include performing user authentication using the frictional sound.

The method may further include determining a movement of a muscle by using an electromyogram sensor, and the executing of the control command may include executing a control command corresponding to a combination of the frictional sound and the detected movement of the muscle.

The method may further include detecting a fingerprint, and the executing of the control command may include executing a control command corresponding to a combination of the detected fingerprint and the frictional sound.

According to another aspect of the present disclosure, there is provided a non-transitory computer-readable recording medium having recorded thereon a program code for executing the method of controlling the electronic apparatus on a computer.

Advantageous Effects of Disclosure

According to one or more embodiments, input signals that a user may naturally input to an electronic apparatus may be provided.

According to one or more embodiments, input signals that are difficult to be illegally used by other people may be provided.

According to one or more embodiments, input signals capable of being implemented at low cost by using a microphone that is relatively cheap may be provided. In addition, input signals that are sound inputs and robust to noise may be provided.

According to one or more embodiments, input signals that are easily changed by a user and have a large number of cases may be provided.

BRIEF DESCRIPTION OF DRAWINGS

FIG. 2 is a block diagram of a structure of an electronic apparatus, according to an embodiment.

FIG. 3 is a table showing a control list in which control commands are defined according to frictional properties, according to an embodiment.

FIG. 4 is a table showing a control list in which control commands are defined according to frictional properties, according to an embodiment.

FIG. 5 illustrates a process in which frictional sound is generated by a human body.

FIG. 7 illustrates frequency distributions of frictional sound inputs by rubbing, with a thumb, a proximal phalanx and a distal phalanx of an index finger when a microphone is located around the distal phalanx.

FIG. 8 is a flowchart of a method of controlling an electronic apparatus, according to an embodiment.

FIG. 9 is a block diagram of a structure of an electronic apparatus, according to another embodiment.

FIG. 10 is a table showing results of tests conducted in noisy environments, according to one or more embodiments.

FIG. 12 illustrates a process in which external sound is transmitted to a membrane of a microphone.

FIG. 15 illustrates how frictional sound inputs correspond to existing touch inputs and which control commands define the frictional sound inputs, according to an embodiment.

BEST MODE

Figure 1:
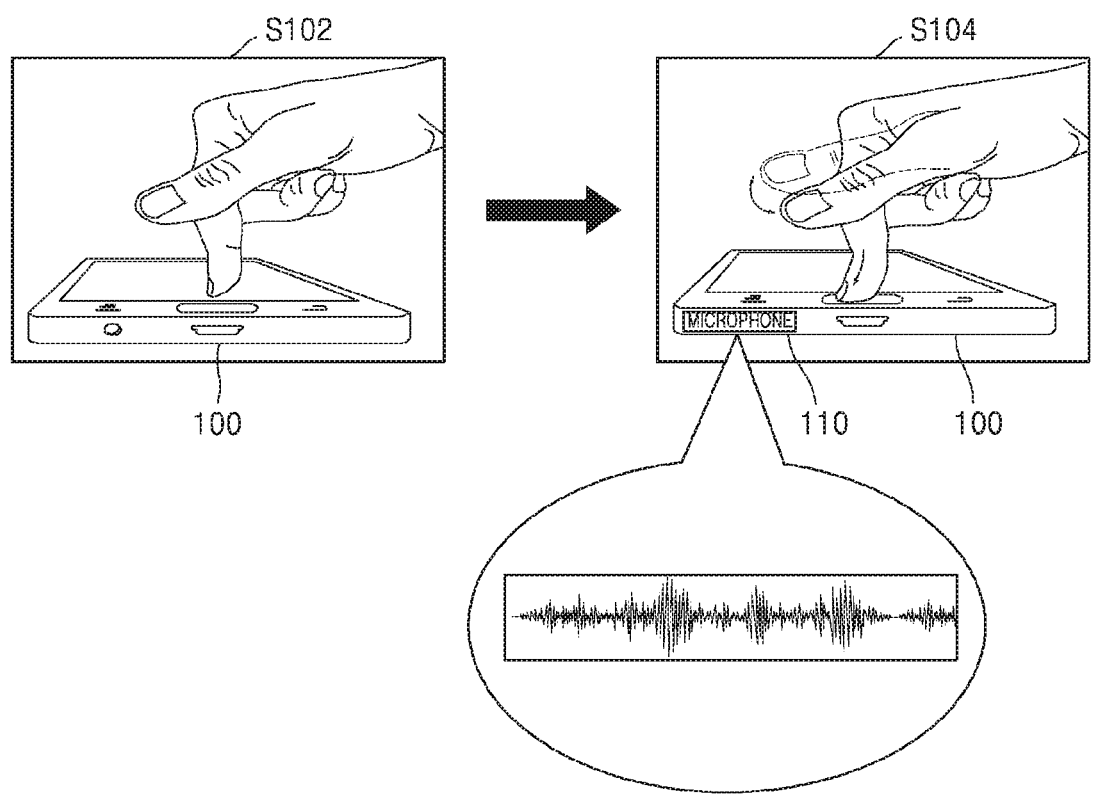
FIG. 1 illustrates a method of generating a frictional sound input, according to an embodiment.

According to an aspect of the present disclosure, there is provided an electronic apparatus including: a microphone configured to receive an audio signal; and a processor configured to detect frictional sound from the audio signal, determine a frictional property by analyzing a characteristic of the detected frictional sound, and execute a control command corresponding to the frictional property.

MODE OF DISCLOSURE

Embodiments of the present disclosure will now be described more fully with reference to the accompanying drawings so that the embodiments can be easily practiced by one of ordinary skill in the art to which the present disclosure pertains. The disclosure may be embodied in many different forms and should not be construed as being limited to the embodiments set forth herein. In addition, portions that are irrelevant to the description of the disclosure are omitted for clarity of explanation, and like reference numerals in the drawings denote like elements.

Throughout the specification, it will be understood that when a portion is referred to as being "connected to" another portion, it can be "directly or electrically" connected to the other portion. That is, for example, intervening portions may be present. Also, when a portion "includes" an element, another element may be further included, rather than excluding the existence of the other element, unless otherwise described.

According to one or more embodiments, input signals are generated using frictional sound generated by body parts. Herein, the frictional sound generated by body parts denotes sound generated by friction between different body parts or sound generated by friction between a body part and an object. For example, the frictional sound generated by body parts may be frictional sound generated between two fingers, frictional sound generated when a finger rubs an object, or the like.

In the present specification, a frictional sound input indicates that frictional sound generated by body parts is used as an input signal of an electronic apparatus. An electronic apparatus according to one or more embodiments may use a microphone to receive an audio signal, detect the frictional sound from the received audio signal, and use the frictional sound as an input signal of the electronic apparatus. Such an input may be referred to as a frictional sound input. The electronic apparatus may receive the frictional sound input by using the microphone.

FIG. 1 illustrates a method of generating a frictional sound input, according to an embodiment.

According to an embodiment, a user may generate a frictional sound input by rubbing two fingers together. For example, as illustrated in FIG. 1, in operation S102, the user may touch the electronic apparatus (100, hereinafter, the reference numeral "100" collectively indicates electronic apparatuses according to one or more embodiments of the present disclosure) with a hand or may move the hand close to the electronic apparatus 100. Then, in operation S104, the user may make a gesture of rubbing two fingers together. Due to the gesture, frictional sound is generated between the fingers of the user and is detected by a microphone 110 of the electronic apparatus 100, and thus, the frictional sound input is input to the electronic apparatus 100.

FIG. 2 is a block diagram of a structure of an electronic apparatus 100a according to an embodiment.

The electronic apparatus 100a according to the present embodiment includes the microphone 110 and a processor 120a.

The microphone 110 receives audio signals. The microphone 110 converts, into electrical signals, sound transmitted through a medium such as air or water. The frictional sound input is transmitted in a form of an audio signal to the electronic apparatus 100a from the outside thereof, and the microphone 110 converts the frictional sound input, which is in the form of the audio signal, into an electrical signal and detects the electrical signal.

According to an embodiment, the processor 120a may separately set an operation mode of activating the microphone 110 to receive the frictional sound input. For example, when a function regarding playing of music is controlled by the frictional sound input while music is being played on the electronic apparatus 100a, the microphone 110 may be activated to receive the frictional sound input while the music is played. As another example, when a mode of the electronic apparatus 100a is changed to an activation mode by the frictional sound input while the electronic apparatus 100a is in a sleep mode, the processor 120a may activate the microphone 110 in the sleep mode.

The processor 120a may determine, from the frictional sound input, a frictional property determined by a body part, on which the frictional sound is generated, or by a type of a body movement of generating the frictional sound and may execute a control command corresponding to the frictional property.

The frictional property is determined by the body part on which the frictional sound is generated or by the type of the body movement of generating the frictional sound. The type of the body movement is determined based on at least one of a movement direction of a location where friction occurs and a friction method, or a combination thereof.

The body part on which the frictional sound is generated may be classified into, for example, a finger, a toe, an auricle, the back of a hand, etc. Also, the body part may be classified into, within a finger, a distal phalanx, a middle phalanx, and a proximal phalanx of the finger. In addition, the body part may be classified into a hand and clothes, a hand and earphones, etc., according to a type of an object that generates friction with the human body. According to an embodiment, the body part on which the frictional sound is generated may be determined using frictional sound characteristics. When the frictional sound characteristics are determined, an attenuation characteristic per frequency band, an attenuation change in frequencies of the same amplitude, etc. may be used.

Types of body movements may be classified into, for example, a gesture of rubbing a finger with another finger, a gesture of tapping a tip of a finger with a tip of another finger, and the like. According to an embodiment, the types of the body movements may be determined as frictional sound characteristics. When the frictional sound characteristics are determined, the processor 120a may use a sound amplitude, the number of times that the amplitude changes, a gradient of the amplitude according to time, and the like.

According to an embodiment, the processor 120a may analyze sound by using a software module using a machine-learning method and may determine the frictional property. For example, the processor 120a may use the machine-learning method used for voice recognition. In this case, the processor 120a may recognize a vibration frequency of a finger tissue and a tone characteristic and may compare the recognized vibration frequency and the recognized tone characteristic with a template that is stored in advance, thereby determining the frictional property.

According to an embodiment, the machine-learning method may be performed in a manner of adjusting a template indicating soundwave characteristics of respective frictional properties defined by the electronic apparatus 100a by receiving the frictional sound input from the user. First of all, the electronic apparatus 100a may display information regarding frictional sound inputs having the defined frictional properties, as a guide to the frictional sound inputs for the user. The information regarding the frictional sound inputs is information regarding a method of generating the frictional sound inputs having the defined frictional properties and may be displayed as, for example, rubbing a thumb with an index finger upwards, tapping the thumb with the index finger, etc. The user generates the frictional sound based on the displayed information regarding the frictional sound inputs and detects an audio signal of the frictional sound. For example, the information regarding the frictional sound inputs is displayed on a setting menu of the electronic apparatus 100a, and a graphical user interface (GUI) for detecting an audio signal is provided. The electronic apparatus 100a may adjust a template regarding the frictional properties defined based on the detected audio signal. For example, the electronic apparatus 100a adjusts soundwave characteristics of the template regarding the defined frictional properties, according to the soundwave characteristics of the detected audio signal.

Control commands corresponding to the frictional properties include, for example, turning on or off the electronic apparatus 100a, adjusting volume of a sound output, answering incoming calls, user authentication, or the like. Also, different control commands may be defined according to each frictional property. For example, while music is played on the electronic apparatus 100a, control commands corresponding to frictional properties may be defined so that volume may be decreased by rubbing a finger from a distal phalanx to a proximal phalanx and may be increased by rubbing the finger from the proximal phalanx to the distal phalanx.

The control commands corresponding to the frictional properties may be predefined. According to an embodiment, the information regarding the control commands corresponding to the frictional properties may be predefined and stored in a storage of the electronic apparatus 100a. As another example, the electronic apparatus 100a may receive, from another apparatus, the information regarding the control commands corresponding to the frictional properties via a network.

FIG. 3 is a table showing a control list in which control commands are defined according to frictional properties, according to an embodiment.

According to an embodiment, the electronic apparatus 100a may store a control list indicating information regarding the control commands defined according to the frictional properties, and when the frictional sound input is detected, the electronic apparatus 100a may retrieve the control commands corresponding to the frictional properties from the control list. According to an embodiment, the control commands may be defined according to frequency characteristics, the number of frictions, and a friction direction. For example, as illustrated in FIG. 3, when a first frequency characteristic 302 is detected twice in a row in the electronic apparatus 100a that is a temperature controller, a control command corresponding to unlocking may be executed, and when a second frequency characteristic 304 is detected once, a control command corresponding to a temperature increase (up) may be executed. When a third frequency characteristic 306 is detected once, a control command corresponding to a temperature decrease (down) may be executed.

FIG. 4 is a table showing a control list in which control commands are defined according to frictional properties, according to an embodiment.

According to an embodiment, when a fourth frequency characteristic 402 is detected twice and then a fifth frequency characteristic 404 is detected once in the electronic apparatus 100a that is a drawer lock device, control commands corresponding to locking and unlocking may be executed, and when a sixth frequency characteristic 406 is detected once, a control command corresponding to setting of a notification mode may be executed. When a seventh frequency characteristic 408 is detected once, a control command corresponding to releasing of the notification mode may be executed.

FIG. 5 illustrates a process in which frictional sound is generated by a human body.

When body tissues are rubbed, chaotic oscillations occur on skin tissues having elasticity. Such chaotic oscillations occur due to nonlinear characteristics of friction. During the oscillations, sound transmitted through body tissues is generated.

As illustrated in FIG. 5, when a second object 520 is rubbed with a first object 510 having elasticity like body tissues, a shape of the first object 510 fits with that of the second object 520, and thus the first object 510 adheres to the second object in operation S502. When the first object 510 adhering to the second object 520 is moved, the first object 510 is deformed, power, which is applied towards the second object 520, is generated due to a restoring force with respect to deformation in operation S504. Thus, the first object 510 adheres to the second object 520 again, which causes friction, thereby generating the frictional sound in operation S506.

When the frictional sound is generated due to the body tissues, sound waves are generated over a wide frequency band. The sound waves are transmitted to the microphone 110 of the electronic apparatus 100a through the body tissues. The sound waves have high reflectivity to other types of media, and thus, when the sound waves are transmitted through the body tissues, a ratio of sound waves lost in the air is greatly reduced. When the sound waves are transmitted through the body tissues, the sound waves are absorbed by the body tissues which have a high absorption rate with respect to high frequencies. Due to non-uniformity of the body tissues, high-frequency components are attenuated more than low-frequency components. Thus, the sound waves transmitted through the body tissues are transmitted to the microphone 110 while the high-frequency components are absorbed by the body tissues. As the body parts generating the frictional sound get farther from the microphone 110, a distance by which the sound waves are transmitted through the body tissues increases, and thus, a degree to which the high-frequency components are absorbed increases. For example, in a state in which a tip of a finger is close to the microphone 110, the frictional sound input generated by a gesture of rubbing the tip of the finger has more high-frequency spectrum noise components than a frictional sound input generated by a gesture of rubbing an inner part of the finger. Therefore, the processor 120a may determine a location of a body tissue where the frictional sound is generated based on a frequency distribution of the audio signal detected by the microphone 110.

Figure 6:
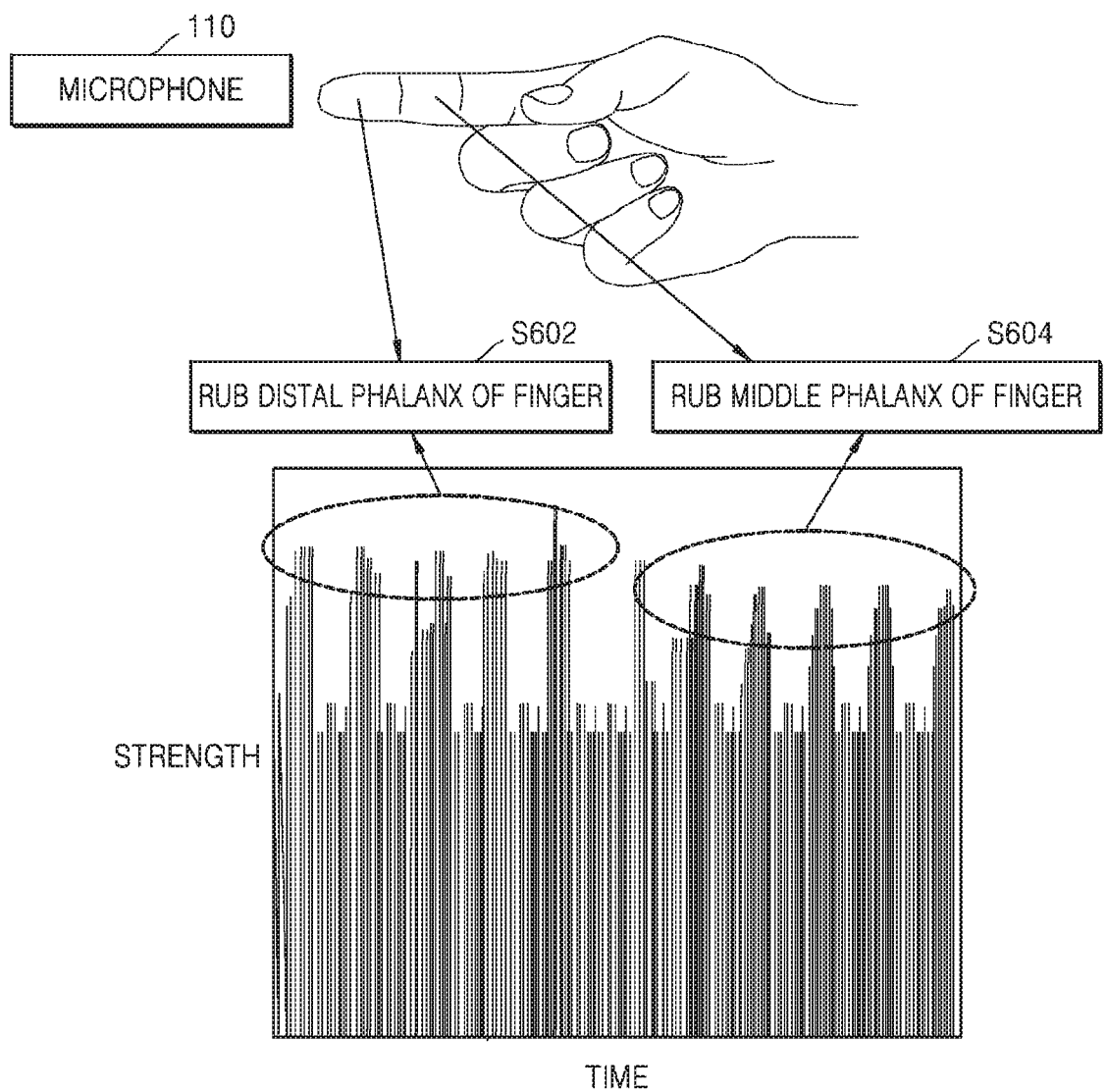
FIG. 6 illustrates signals detected by a microphone when a frictional sound input is generated by rubbing an index finger with a thumb, according to an embodiment.

FIG. 6 illustrates signals detected by the microphone 110 when a frictional sound input is generated by a gesture of rubbing a thumb with an index finger, according to an embodiment.

As described above, a signal of the frictional sound input has a characteristic in which the high-frequency components are decreased as friction is generated far from the microphone 110. Referring to signal waveforms of FIG. 6, when the microphone 110 is located around a tip of a finger, strengths of the high-frequency components are different between operation S602 of rubbing a distal phalanx of the finger and operation S604 of rubbing a middle phalanx of the finger.

FIG. 7 illustrates frequency distributions of frictional sound inputs when a thumb rubs a proximal phalanx and a distal phalanx of an index finger when the microphone 110 is located near the distal phalanx.

As illustrated in FIG. 7, the high-frequency components are decreased more in operation S720 of rubbing an inner part of the finger, compared to operation S704 of rubbing the distal phalanx. This is because, while the frictional sound, which is generated by rubbing an inner proximal phalanx that is far from the microphone 110, is transmitted through the finger, the high-frequency components are absorbed by the body tissues. Thus, the processor 120a may determine whether the frictional sound input is generated by rubbing the inner part or the distal phalanx of the finger. For example, the processor 120a may store in advance a template 710 regarding a frequency characteristic when the inner part of the finger is rubbed and a template 720 regarding a frequency characteristic when the distal phalanx of the finger is rubbed. By comparing the frequency characteristics of the templates 710 and 720 with the frequency characteristics of the frictional sound input, frictional properties of a corresponding frictional sound input may be determined.

According to an embodiment, the processor 120a may determine the frictional properties based on data included in a certain frequency range of the frictional sound input. The certain frequency range may be a frequency region where attenuation of the high frequency components by the body tissues is observed. According to an embodiment, the certain frequency range may be from about 20 Hz to about 20 KHz. Since the attenuation of the high-frequency components during transmission of a wave through the body tissues is noticeable, the processor 120a may determine the frictional properties based on data included in a corresponding frequency range. According to an embodiment, the electronic apparatus 100a may include a band pass filter through which signals in the certain frequency range pass, and thus may determine the frictional properties based on the data included in the certain frequency range.

FIG. 8 is a flowchart of a method of controlling the electronic apparatus 100a, according to an embodiment.

In operation S802, the electronic apparatus 100a receives an audio signal by using the microphone 110. When the audio signal is input, the processor 120a detects frictional sound from the audio signal in operation S804.

According to an embodiment, the processor 120a may detect the frictional sound based on a change in amplitude of the audio signal. For example, when the change in the amplitude of the audio signal exceeds a certain reference value, the processor 120a may determine, as a start point of a frictional sound interval, a point in time when the change in the amplitude is detected or a point in time ahead of the change in the amplitude, and may detect the frictional sound from the start point. Also, while a level of the audio signal is maintained at a certain level from the start point, the frictional sound interval is maintained, and the frictional sound is detected from the audio signal. After the start point, the level of the audio signal is decreased to be less than or equal to the certain level. When the decreased level is maintained for a certain period of time, the frictional sound interval may end, and the detection of the frictional sound may also end.

According to an embodiment, the processor 120a may determine a time interval corresponding to frictional sound by using soundwave characteristics of the frictional sound, and may detect a signal of a corresponding interval as the frictional sound. For example, a template regarding the soundwave characteristics of the frictional sound may be stored in advance in the electronic apparatus 100a, and the processor 120a may compare the template regarding the soundwave characteristics of the frictional sound with an audio signal and thus may detect the frictional sound. The template regarding the soundwave characteristics of the frictional sound may be defined as a signal characteristic such as a frequency distribution or a waveform size change. The comparison of the template with the audio signal may be performed by performing a process such as differential signal analysis or convolution.

According to an embodiment, when detecting the frictional sound, the processor 120a may consider both the change in the amplitude and the soundwave characteristics of the audio signal to detect the frictional sound.

The processor 120a may analyze the characteristics of the detected frictional sound and determine the frictional properties in operation S806. For example, the processor 120a may compare the template, which is stored in advance, with the frequency distribution of the frictional sound and may determine the frictional properties.

When the frictional properties are determined, the processor 120a executes control commands corresponding to the frictional properties in operation S808. As described above, the information regarding the control commands corresponding to the frictional properties may be predefined.

FIG. 9 is a block diagram of a structure of an electronic apparatus 100b according to another embodiment.

The electronic apparatus 100b according to the present embodiment includes the microphone 110, an analog-to-digital converter (ADC) 910, a processor 120b, an output device 920, and a storage 930. According to the present embodiment, a frictional sound input, which is in a form of an analog signal input through the microphone 110, is converted into a digital signal by the ADC 910, and then the digital signal is input to the processor 120b. The processor 120b determines frictional properties of the frictional sound input that is input from the ADC 910. When the frictional properties are determined, the processor 120b executes a control command corresponding to the frictional sound input, based on information regarding a control command corresponding to a frictional property stored in the storage 930. The processor 120b outputs, to the output device 920, a result of the control command corresponding to the frictional property.

The output device 920 may be, for example, a display, a touch screen, a speaker, an LED display light, a vibration device, or the like. In an embodiment, when volume of music being played increases as a result of the frictional sound input, volume of sound output through the speaker may increase. In another embodiment, when user authentication is performed as a result of the frictional sound input, a screen corresponding to a next process performed as a result of the user authentication may be displayed on the display.

One or more embodiments may be implemented at low cost and in a small space. To use the frictional sound input, the electronic apparatus 100 according to embodiments requires the microphone 110. The microphone 110 is already employed by various electronic apparatuses such as a smart phone, a smart watch, a tablet personal computer (PC), and smart glasses. Thus, the frictional sound input may be used without additional costs by using the microphone that is already included. Also, the microphone is really cheap and small. For example, the microphone may be less than USD 0.5. There are lots of microphones having a size of 1 cm or less, and there are some microphones having a size of about 1 mm. As described above, microphones required to implement embodiments are highly small and cheap. The microphones may be included in various types of electronic apparatuses at low cost and may have little spatial limitation.

Also, according to one or more embodiments, the frictional sound input may be input to the electronic apparatus 100 even though the user does not directly look at the electronic apparatus 100. According to one or more embodiments, when the user makes a gesture of moving a hand closely to the electronic apparatus 100 or generating the frictional sound input while the hand is in contact with the electronic apparatus 100, the frictional sound input may be generated. Once the user knows where the electronic apparatus 100 is, the user may make the above gestures without directly looking at the electronic apparatus 100. Thus, the user may easily manipulate the electronic apparatus 100 by using the frictional sound input.

In addition, the frictional sound input according to embodiments may be easily combined with other types of inputs. When the frictional sound input is generated by a finger, the user may generate the frictional sound input while touching a fingerprint sensor included in the electronic apparatus 100 with the finger, and thus, the user may easily obtain a fingerprint input and the frictional sound input at the same time. As another example, the electronic apparatus 100 uses a gyroscope sensor and detects a user's gesture generated while the user generates the frictional sound input, thereby simultaneously obtaining the motion input and the frictional sound input. As another example, the electronic apparatus 100 uses an electromyogram sensor, etc. and detects a movement of a muscle while the user generates the frictional sound input, thereby simultaneously obtaining information regarding the movement of the muscle and the frictional sound input.

Also, the frictional sound inputs according to one or more embodiments may be easily changed. In particular, when the frictional sound input is used as a password for user authentication, a frictional property that is set as the password may be changed. Recently, there have been various attempts to perform user authentication by using fingerprints, veins, irises, retinas, DNA, etc., and it is difficult to change the biometric signals listed above. However, since the frictional sound input may be easily changed as a frictional property desired by the user from among the frictional properties, the security may be improved by changing a frictional property used for user authentication.

Also, one or more embodiments are little likely to be illegally used. When a frictional sound input is used as a password for the user authentication, the user may generate a frictional sound input by making a gesture that is rarely viewed by other people, and thus a possibility of illegal use may decrease. For example, when a frictional property for user authentication is set based on a combination of phalanxes that the user rubs, although each phalanx is rubbed in a determined order to generate the frictional sound input, it is difficult for other people to know the order or an accurate gesture. Therefore, the user may set the frictional property for the user authentication based on a gesture that is hardly viewed by other people, and the security may be improved.

Also, according to one or more embodiments, the number of cases of frictional sound inputs that may be generated is almost infinite. Since the frictional sound inputs may be generated by various gestures, the number of cases is almost infinite. When the frictional sound inputs are generated by hand only, fingers may generate a variety of frictional sound inputs, and thus, there are a large number of cases of frictional sound inputs possible. When the frictional sound inputs are used as passwords for the user authentication, the security may increase because of the large number of cases. In addition, when the frictional sound inputs are used as commands for controlling the electronic apparatus 100, since there are a large number of cases of the frictional sound inputs that the user may use, a large number of commands may be set by using various types of frictional properties.

FIG. 10 is a table showing results of tests conducted in noisy environments, according to one or more embodiments.

Frictional sound inputs are greatly robust to noise when the user generates frictional sound while the electronic apparatus 100 is in contact with the user's body. As shown in FIG. 10, as a result of conducting the tests by using a smart phone, when the frictional sound input is input while the user's body is in contact with the smart phone, external noise has gone up to 75 dB, but an error rate is less than or equal to 5%. A noise level of 70 dB is measured, for example, when a person takes a shower or a dish washer operates, and this noise level is considered to be high in our daily life. Therefore, the frictional sound input has an error rate sufficient to be used at a high noise level.

Figure 11:
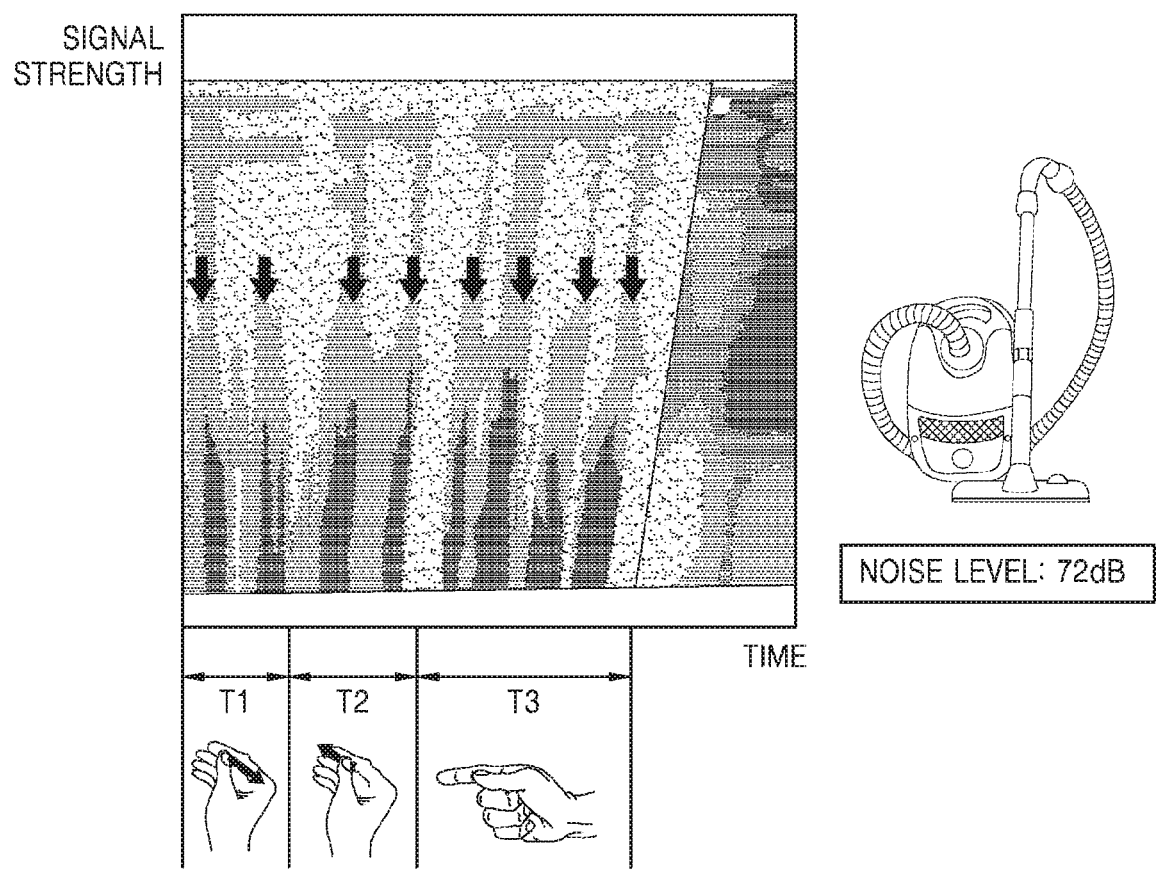
FIG. 11 illustrates a result of a test of receiving frictional sound inputs in an environment in which a vacuum cleaner is used.

FIG. 11 illustrates a result of a test of receiving frictional sound inputs in an environment in which a vacuum cleaner is used.

FIG. 11 illustrates a result of a test conducted in an environment in which a vacuum cleaner having a noise level of about 72 dB is used. When the vacuum cleaner is used, the user generated a frictional sound input by rubbing a finger from a distal phalanx to a proximal phalanx in a period T1, a frictional sound input by rubbing the finger from the proximal phalanx to the distal phalanx in a period T2, and a frictional sound input by rubbing a middle phalanx in a period T3. As illustrated in FIG. 9, in the environment in which the vacuum cleaner operates, signals indicating peak values are at locations indicated by arrows due to the frictional sound inputs. Based on the results, the frictional sound inputs are at levels that are measurable even in the environment in which the vacuum cleaner having an enormously high noise level in our daily life operates.

Also, according to one or more embodiments, although the frictional sound input is generated when a body part is not in contact with the electronic apparatus 100 but is in a vicinity thereof, an error rate at which the frictional sound input may be used is measured.

As illustrated in FIG. 10, when external noise has a level of 10 dB, an error rate is less than or equal to 10% even though the body part generating the frictional sound input is about 1 to 2 cm away from the electronic apparatus 100. Therefore, when the body part does not contact the electronic apparatus 100 but is close thereto, the frictional sound input may be used.

FIG. 12 illustrates a process in which external sound is transmitted to a membrane 1230 of the microphone 110. Referring to FIG. 12, a case, where external sound propagates in the air and is transmitted to the membrane 1230 of the microphone 110 through the pin holes 1220 formed in a case 1210 of the electronic apparatus 100, and a case, where the frictional sound input is transmitted to the membrane 1230 of the microphone 110 when the pin hole 1220 formed at the location corresponding to the microphone 110 is blocked, are compared with each other and described.

As illustrated on the left side of FIG. 12, when the external sound is transmitted to the membrane 1230 of the microphone 110, a sound input intended by the user and noise are transmitted to the membrane 1230 of the microphone 110. As illustrated on the right side of FIG. 12, when the user generates the frictional sound input by blocking the pin hole 1220 by a finger and the frictional sound input is transmitted to the membrane 1230 of the microphone 110, external noise is mostly blocked, and only sound transmitted from a tip of a finger is transmitted to the membrane 1230 of the microphone 110. It is because, when the pin hole 1220 is blocked by the finger, external soundwaves are rarely transmitted to the membrane 1230 of the microphone 110, and soundwaves generated due to vibration of skin are mostly transmitted to the membrane 1230 of the microphone 110 through the pin hole 1220. Accordingly, the frictional sound input is highly robust to noise.

Figure 13:
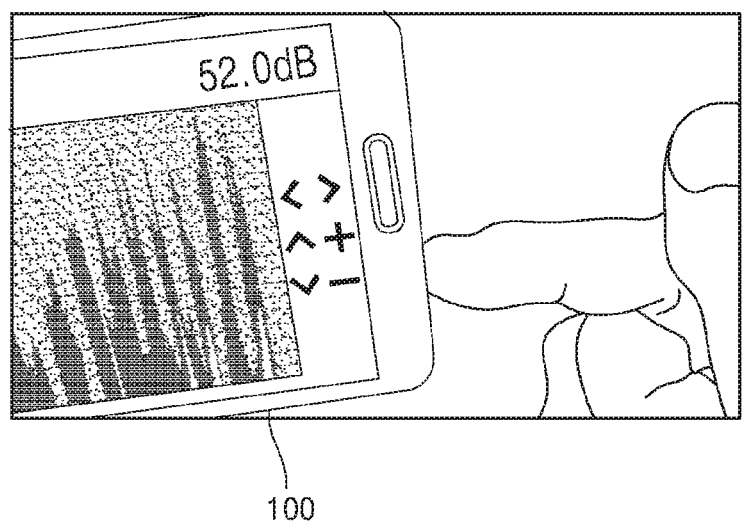
FIG. 13 illustrates an audio signal detected from an electronic apparatus when a frictional sound input is generated while a pin hole of the electronic apparatus is blocked by a finger, according to an embodiment.

FIG. 13 illustrates an audio signal detected from the electronic apparatus 100 when a frictional sound input is generated while the pin hole 1220 of the electronic apparatus 100 is blocked by a finger, according to an embodiment. FIG. 13 illustrates a result of a test conducted when ambient noise is 13 dB. A horizontal axis of a graph of FIG. 13 indicates time, and a vertical axis indicates signal strength.

When the frictional sound input is generated while the pin hole 1220 of the electronic apparatus 100 is blocked by the finger, as illustrated in FIG. 13, a highly clear soundwave pattern of the frictional sound input that has a level of about 52 dB is examined.

Figure 14:
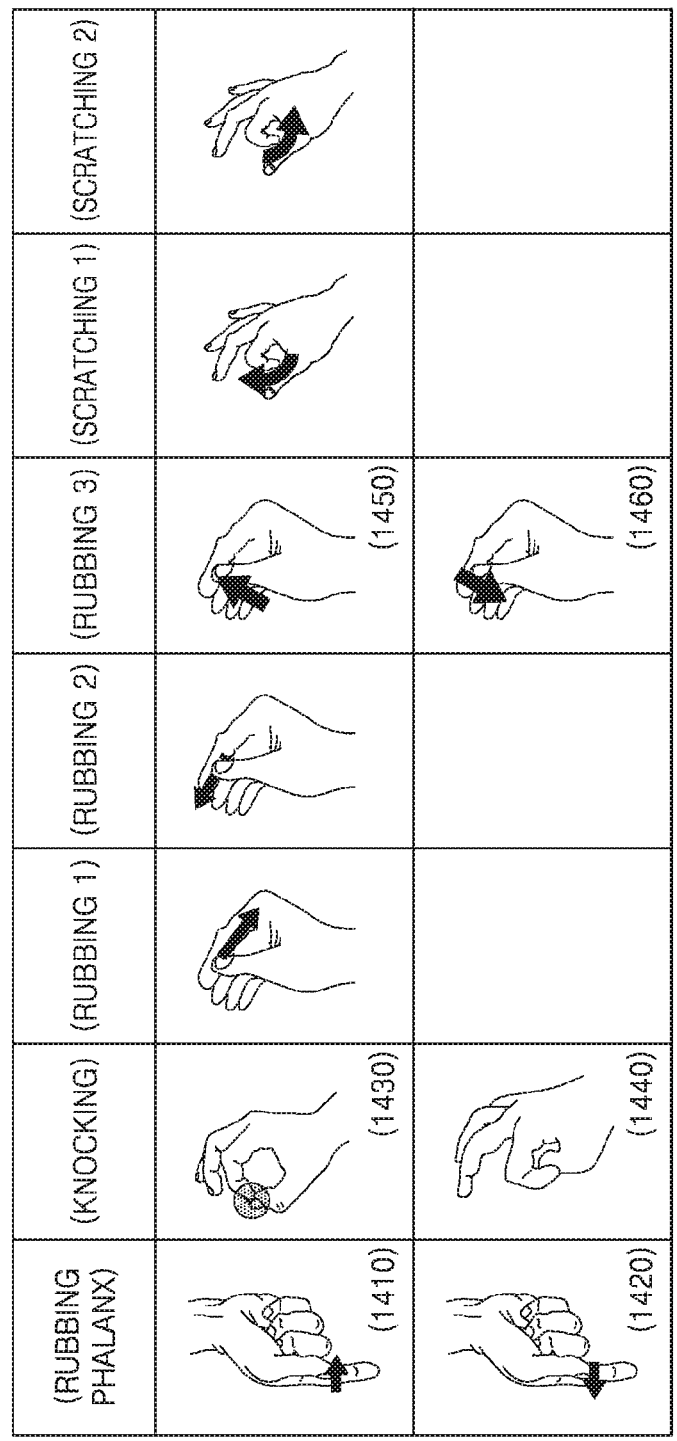
FIG. 14 illustrates user's motions of generating frictional sound inputs having frictional properties identifiable by fingers, according to an embodiment.

FIG. 14 illustrates user's motions of generating frictional sound inputs having frictional properties identifiable by fingers, according to an embodiment.

The frictional properties are defined by a body part generating the frictional sound, a movement direction of a location where friction is generated, a friction method (e.g., rubbing, knocking, scratching, etc.), and the number of frictions, or defined by a combination thereof. In addition, the frictional properties may be defined by an order of operations of generating the frictional sound.

According to an embodiment, different types of frictional sound inputs may be generated by using fingers that make various gestures such as rubbing a phalanx, knocking, first rubbing, second rubbing, third rubbing, first scratching, and second scratching.

Rubbing a phalanx is a gesture of rubbing a phalanx. For example, one of a proximal phalanx, a middle phalanx, and a distal phalanx may be rubbed with a thumb. According to an embodiment, a first phalanx rubbing gesture 1410 of rubbing one phalanx of a finger in a first direction and a second phalanx rubbing gesture 1420 of rubbing a phalanx of a finger in a second direction may be defined as different types of frictional properties.

Knocking is a gesture of knocking tips of two fingers or a tip and a phalanx of a finger. For example, a tip of a thumb and a tip of an index finger may knock each other. Knocking may be performed various numbers of times, according to embodiments. According to an embodiment, knocking may be defined as different types of frictional properties according to the number of times that knocking is performed. Also, according to an embodiment, a gesture 1430 of knocking tips of two fingers and a gesture 1440 of knocking a tip of one finger and a phalanx of another finger may be defined as different types of frictional properties.

First rubbing is a gesture of rubbing a finger from a distal phalanx of the finger to a proximal phalanx thereof with another finger. For example, the first rubbing is a gesture of rubbing an index finger from a distal phalanx of the index finger to a proximal phalanx thereof with a thumb. Second rubbing is a gesture of rubbing a finger from a proximal phalanx of the finger to a distal phalanx thereof with another finger. For example, the second rubbing is a gesture of rubbing the index finger from a proximal phalanx of the index finger to a distal phalanx thereof with the thumb.

Third rubbing is a gesture of rubbing a finger with the thumb upwards. According to an embodiment, a gesture 1450 of rubbing two or more fingers in a direction from a little finger to the index finger and a gesture 1460 of rubbing with the thumb two or more fingers in a direction from the index finger to the little finger may be defined as different types of frictional properties.

First scratching is a gesture of scratching a finger with a nail of another finger in a direction from a proximal phalanx of the finger to a distal phalanx thereof. Second scratching is a gesture of scratching a finger with a nail of another finger in a direction from a distal phalanx of the finger to a proximal phalanx thereof.

When the above gestures such as rubbing a phalanx, first to third rubbing, and first and second scratching are performed various numbers of times according to embodiments, the gestures may be used as control commands of different inputs.

FIG. 15 illustrates how frictional sound inputs correspond to existing touch inputs and which control commands define the frictional sound inputs, according to an embodiment.

Touch inputs may be input to the electronic apparatus 100 by using a touch screen, a touch sensor, etc. However, in an electronic apparatus, e.g., a smart watch, smart glasses, and the like, which has a spatial limitation on placing the touch screen or the touch sensor, the use of touch inputs is limited. In addition, when touch inputs are used in an electronic apparatus such as a smart phone or a tablet PC, the user needs to make gestures for touch inputs while looking at the electronic apparatus 100, and thus the user inconvenience is caused. According to an embodiment, as illustrated in FIG. 13, the touch inputs may be replaced with frictional sound inputs.

First of all, a touch input of tapping a touch screen with a finger once may be replaced with a frictional sound input of tapping the touch screen once, and a touch input of tapping the touch screen twice may be replaced with a frictional sound input of tapping the touch screen twice. A touch input of dragging the touch screen leftward may be replaced with a first rubbing frictional sound input, and a touch input of dragging the touch input rightward may be replaced with a second rubbing frictional sound input. A pinch zoom-out touch input of moving two fingers in opposite directions while the two fingers touch the touch screen may be replaced with a first scratching frictional sound input, and a pinch zoom-in touch input of moving two fingers to come close to each other while the two fingers touch the touch screen may be replaced with a second scratching frictional sound input. A touching-holding touch input of touching the touch screen with a finger and holding a touch state for a certain period of time may be replaced with a frictional sound input of tapping the touch screen three times.

Frictional properties may be defined by combining two types of frictional sound inputs. For example, a holding-moving touch input of holding the touch state for a certain period of time and moving the finger may be replaced with a frictional sound input generated by a combination of tapping the touch screen three times and first rubbing.

Figure 16:
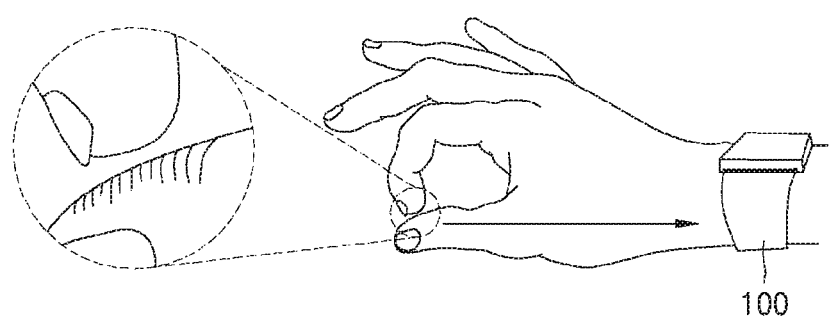
FIG. 16 illustrates a gesture of generating a frictional sound input, according to an embodiment.

FIG. 16 illustrates a gesture of generating a frictional sound input, according to an embodiment.

According to an embodiment, a gesture of scratching, with a nail of a finger, skin of another finger may be used as a gesture of generating the frictional sound input. The gesture may generate a strong audio signal having a unique soundwave characteristic and may be identified by the electronic apparatus 100. For example, as illustrated in FIG. 16, when the user wearing the smart watch generates the frictional sound input by scratching skin of another finger with a nail, the frictional sound input is transmitted to the smart watch through skin tissues.

According to an embodiment, as a frictional sound input generated by scratching skin with nails and a user's motion are detected and used together, the detection accuracy of the frictional sound input may be improved. For example, the electronic apparatus 100 includes a motion sensor (e.g., an acceleration sensor, a gyroscope sensor, etc.), and when the frictional sound input and the user's motion are simultaneously detected, frictional properties of the frictional sound input may be determined by considering soundwave characteristics of the frictional sound input and the detected user's motion. In this case, the detected user's motion may be a user's motion detected when another finger is scratched with a nail.

According to an embodiment, the electronic apparatus 100 may combine detection value data of the motion sensor (e.g., the acceleration sensor, the gyroscope sensor, etc.) with soundwaves transmitted into the skin tissues or skin frictional sound propagating in the air and may recognize a user's motion. According to the present embodiment, although a signal to noise ratio (SNR) is low because the sound waves transmitted into the skin tissues or the skin frictional sound propagating in the air have low intensity, accuracy of detecting a user's gesture may be improved.

The frictional sound input according to an embodiment may be generated by rubbing a palm with a finger, rubbing the back of a hand with a finger, rubbing an ear with a finger, and rubbing a body with a hand. Also, the frictional sound input according to an embodiment may be generated by rubbing other body parts with body parts such as a palm, the back of the hand, and a side of the hand instead of with fingers.

Figure 17:
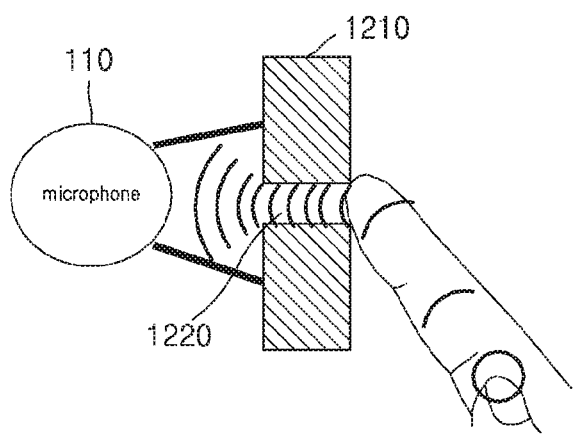
FIG. 17 illustrates a method of inputting a frictional sound input, according to an embodiment.

FIG. 17 illustrates a method of inputting a frictional sound input, according to an embodiment.

According to an embodiment, the frictional sound input may be generated while the user blocks the pin hole 1220 formed at the location corresponding to the microphone 110 by a body part and makes a gesture of generating a frictional sound input. In this case, as described above, the noise is blocked, and the soundwaves transmitted through the body tissues may be may be transmitted to the microphone 110 at a high intensity.

Methods of detecting a state in which the pin hole 1220 is blocked by a body part includes a method of using a touch sensor around the pin hole 1220, a method of detecting a movement or shaking of the electronic apparatus 100, a method of detecting the state based on a characteristic of an audio signal detected by the microphone 110, and the like.

Figure 18:
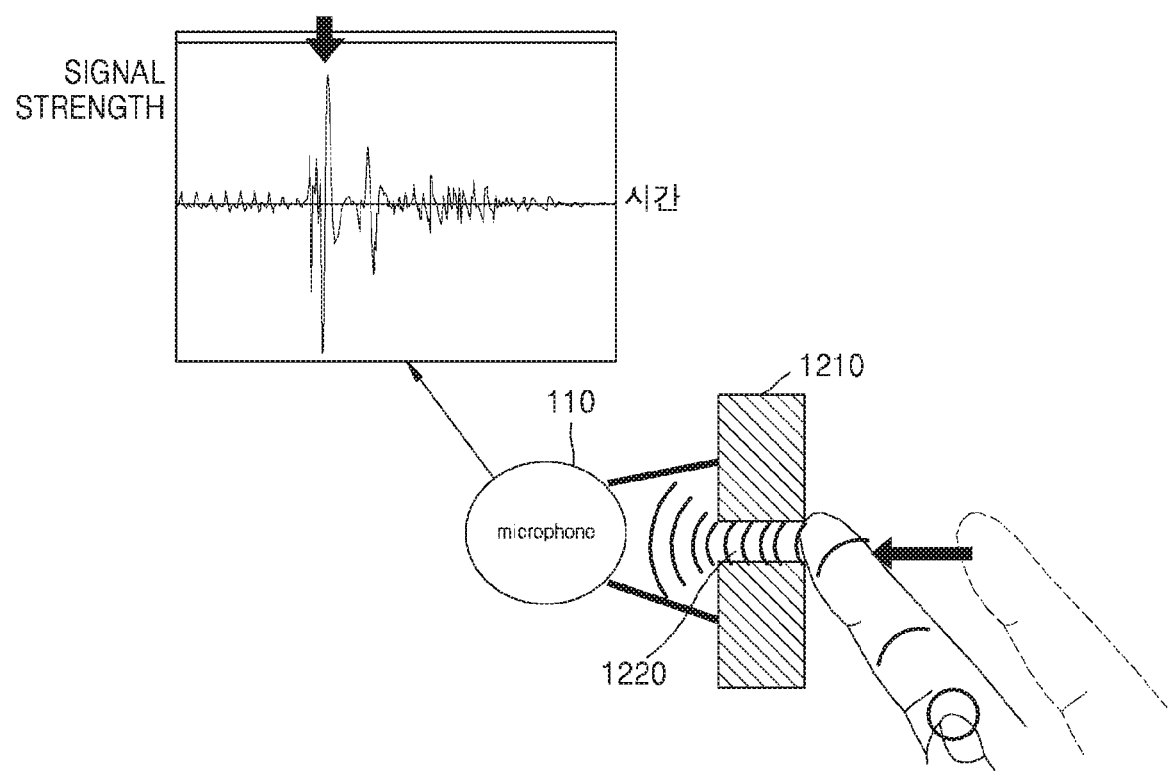
FIG. 18 illustrates a characteristic of an audio signal when a pin hole is blocked by a body part.

FIG. 18 illustrates a characteristic of an audio signal when the pin hole 1220 is blocked by a body part.

When the pin hole 1220 is blocked by the body part while the pin hole 1220 is open, a waveform of the audio signal has characteristics whereby signal strength increases, and a first peak is detected in a direction in which a signal rises in a positive direction, and a rate of crossing a time axis decreases. The electronic apparatus 100 detects the characteristics and detects that the pin hole 1220 is blocked by the body part.

According to an embodiment, after detecting that the pin hole 1220 is blocked by the body part, the electronic apparatus 100 may detect frictional sound based on a change in the amplitude of the audio signal that is input within a certain period of time. For example, when the electronic apparatus 100 detects that the pin hole 1220 is blocked by the body part, the electronic apparatus 100 performs a process of detecting the frictional sound from the audio signal from the period of time. The process of detecting the frictional sound may be, for example, a process of comparing the audio signal with a template that is stored in advance, a process of detecting the change in the amplitude of the audio signal, and the like.

Figure 19:
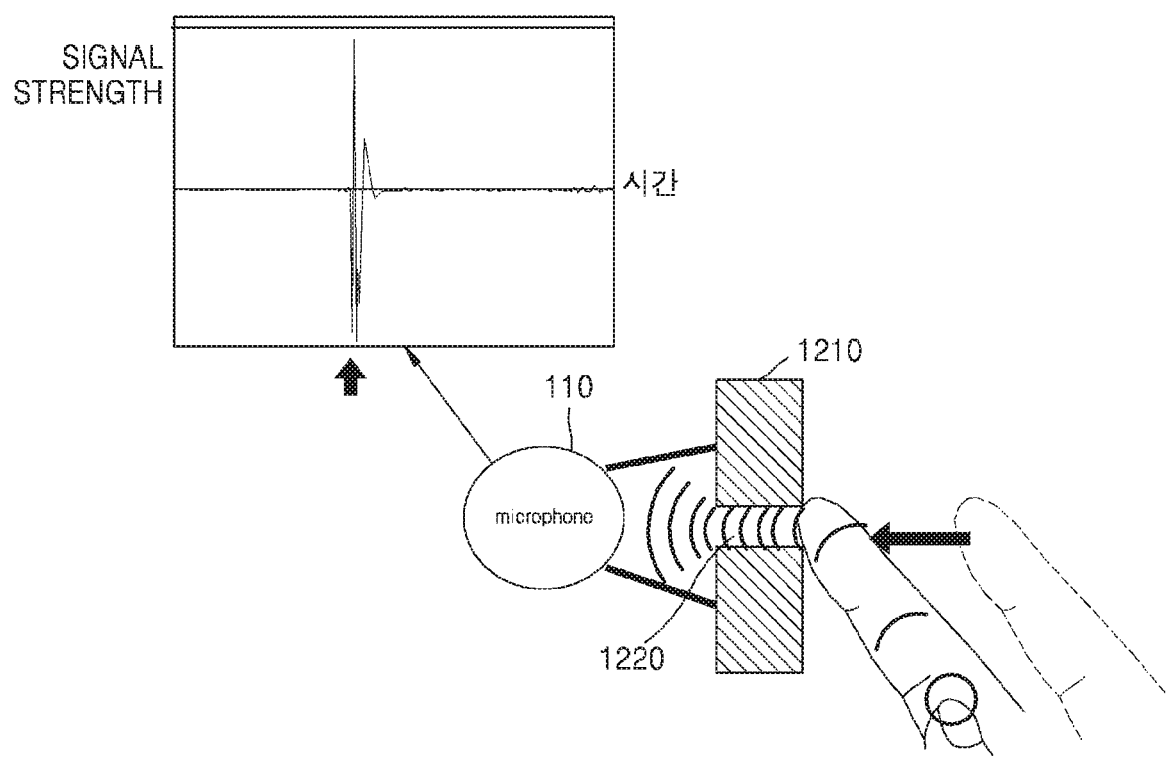
FIG. 19 illustrates a characteristic of an audio signal when a pin hole is blocked by a body part and then unblocked.

FIG. 19 illustrates a characteristic of an audio signal when the pin hole 1220 is blocked by a body part and then unblocked.

When the pin hole 1220 is blocked by the body part and unblocked, a waveform of the audio signal has characteristics in which signal strength increases, a first peak is detected in a direction in which a signal decreases in a negative direction, and a crossing rate with a time axis decreases. The electronic apparatus 100 detects the characteristics and detects that the pin hole 1220 is blocked by the body part and is unblocked.

Figure 20:
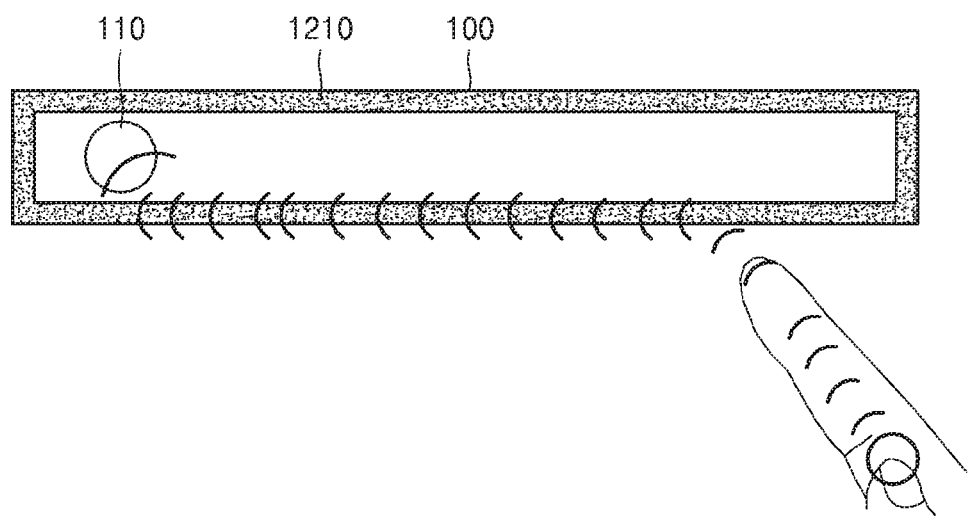
FIG. 20 illustrates a method of inputting a frictional sound input, according to an embodiment.

FIG. 20 is a diagram for explaining a method of inputting a frictional sound input, according to an embodiment.

According to an embodiment, the frictional sound input may be generated by making a gesture of generating a frictional sound input while a body part of the user is in contact with the case 1210 of the electronic apparatus 100. In this case, frictional sound reaches the microphone 110 through the body tissues and the case 1210 of the electronic apparatus 100. An attenuation rate is low when the soundwaves are transmitted through the case 1210 of the electronic apparatus 100, compared to a case where the soundwaves are transmitted by air, and thus, the soundwaves of the frictional sound input may be transmitted to the microphone 110 at a high intensity.

Figure 21:
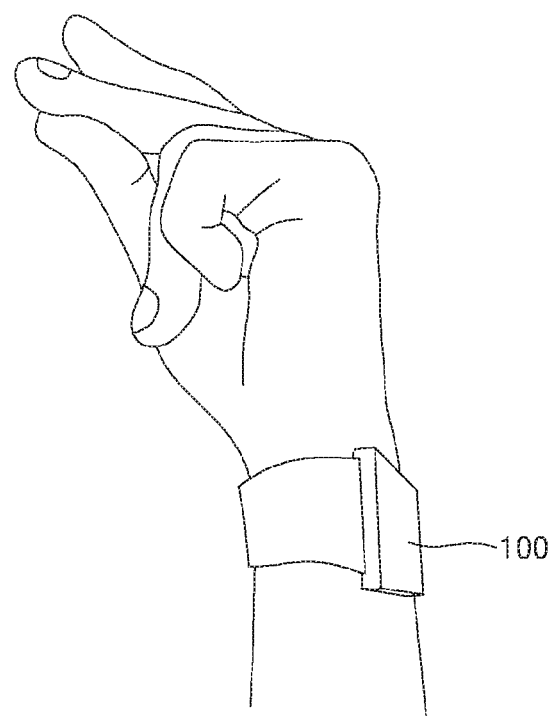
FIG. 21 illustrates a gesture of receiving a frictional sound input while an electronic apparatus that is a wearable device is worn, according to an embodiment.

FIG. 21 illustrates a gesture of receiving a frictional sound input while an electronic apparatus 100 that is a wearable device is worn, according to an embodiment.

Since wearable devices are usually in contact with the human body while being used, when the electronic apparatus 100 that is the wearable device receives the frictional sound input, the electronic apparatus 100 receives the frictional sound input while a case 1210 of the electronic apparatus 100 contacts the body part. In this case, the frictional sound input is input to the electronic apparatus 100 through a body tissue and the case 1210 of the electronic apparatus 100, and thus, the electronic apparatus 100 may detect an audio signal of the frictional sound input which has a high intensity.

Figure 22:
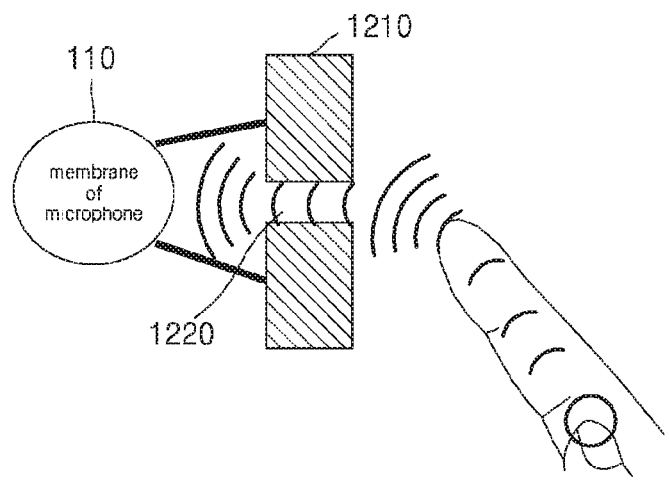
FIG. 22 illustrates a gesture of generating a frictional sound input by placing a body part, where the frictional sound input is generated, in a vicinity of a pin hole formed at a location corresponding to a microphone.

FIG. 22 illustrates a gesture of generating a frictional sound input by placing a body part, where the frictional sound input is generated, in a vicinity of a pin hole 1220 formed at a location corresponding to the microphone 110.

According to an embodiment, the electronic apparatus 100 may receive the frictional sound input while the body part generating the frictional sound input is in the vicinity of the pin hole 1220. For example, the electronic apparatus 100 may receive the frictional sound input in a state in which the body part taking an action of generating the frictional sound input is within a detection limitation range from the pin hole 1220 of the electronic apparatus 100. The detection limitation range may be determined based on the sensitivity, noise removal performance, etc. of the microphone 110 and may be, for example, 2 cm or the like. According to the present embodiment, since the user does not have to contact the electronic apparatus 100, the user may easily take an action of generating the frictional sound input.

According to one or more embodiments of the present disclosure, the electronic apparatus 100 may combine the frictional sound input with other types of inputs and then use the combined inputs. For example, the frictional sound input may be combined with a motion input, a detection value of an electromyogram sensor, a fingerprint, and the like.

Figure 23:
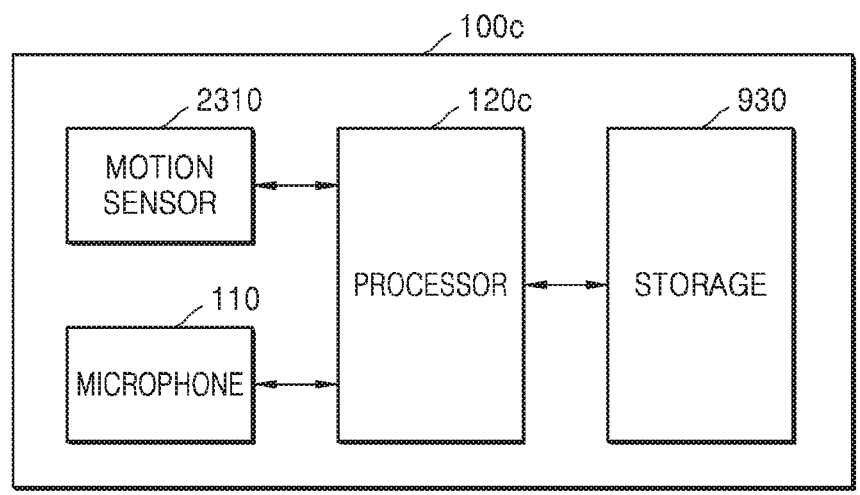
FIG. 23 is a block diagram of a structure of an electronic apparatus, according to an embodiment.

FIG. 23 is a block diagram of a structure of an electronic apparatus 100c, according to an embodiment.

The electronic apparatus 100c according to the present embodiment includes a motion sensor 2310, the microphone 110, a processor 120c, and the storage 930. The electronic apparatus 100c according to the present embodiment includes the motion sensor 2310 and operates by considering a user's motion detected by the motion sensor 2310 and a frictional sound input received by the microphone 110.

The motion sensor 2310 is a sensor for detection a user's motion. For example, the motion sensor 2310 may include, for example, an acceleration sensor, a gyroscope sensor, or the like. The motion sensor 2310 detects a movement of the electronic apparatus 100c because of the user's motion. The processor 120c may predict the user's motion based on a detection value of the motion sensor 2310.

The processor 120c determines whether the detection value of the motion sensor 2310 and the frictional sound input received by the microphone 110 are detected within a reference time range, and whether there are preset control commands regarding a combination of the detected motion and a frictional property of the frictional sound input. When the motion input and the frictional sound input are received within the reference time range and when there are the preset control commands, the processor 120d may execute a corresponding control command.

The storage 930 stores information about control commands respectively corresponding to various combinations of the motion input and the frictional sound input. The information about the control commands may be expressed as, for example, a control list as described above.

According to an embodiment, an operation mode of activation the microphone 110 and the motion sensor 2310 may be separately set. For example, when a mode of the electronic apparatus 100c is changed to an activation mode by using the frictional sound input and the motion input when the electronic apparatus 100c is in a sleep mode, the microphone 110 and the motion sensor 2310 may be activated in the sleep mode.

Figure 24:
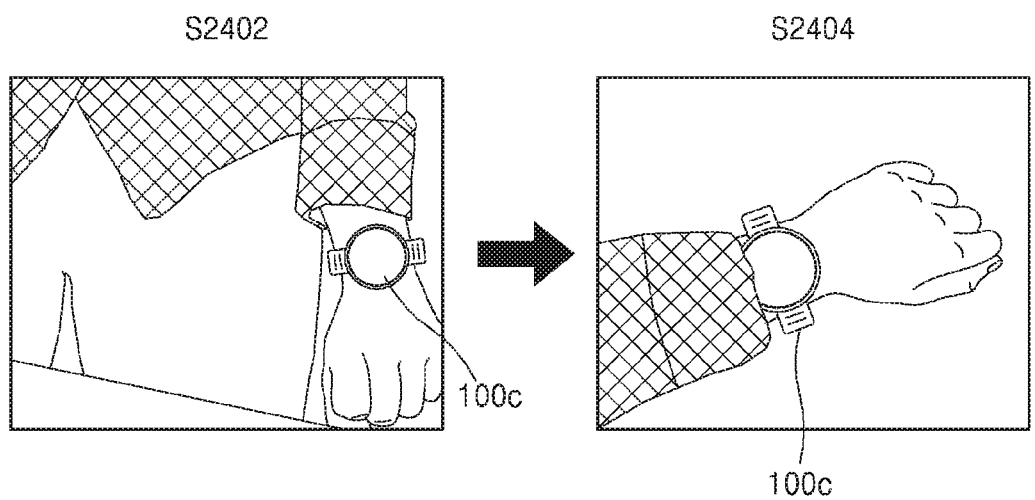
FIG. 24 illustrates a method of controlling the electronic apparatus by using a motion input and a frictional sound input, according to an embodiment.

FIG. 24 illustrates a method of controlling the electronic apparatus 100c by using a motion input and a frictional sound input, according to an embodiment.

According to the present embodiment, when the electronic apparatus 100c that is a smart watch is controlled, the motion input and the frictional sound input may be used together. The motion input may be a motion in which, in operation S2402, the user wearing the smart watch lowers a hand and then, in operation S2404, raises the hand to ensure that a display of the smart watch faces the user's face. The frictional sound input may be a frictional sound input generated by fingers. When the motion input and the frictional sound input are received within the reference time range, the electronic apparatus 100c may execute a corresponding control command of cancelling a sleep mode of the electronic apparatus 100c. In this case, compared to a case where only the motion input or the frictional sound input is used, a user's intention is clearly reflected, and thus a malfunction of the motion input or the frictional sound input may greatly decrease.

Figure 25:
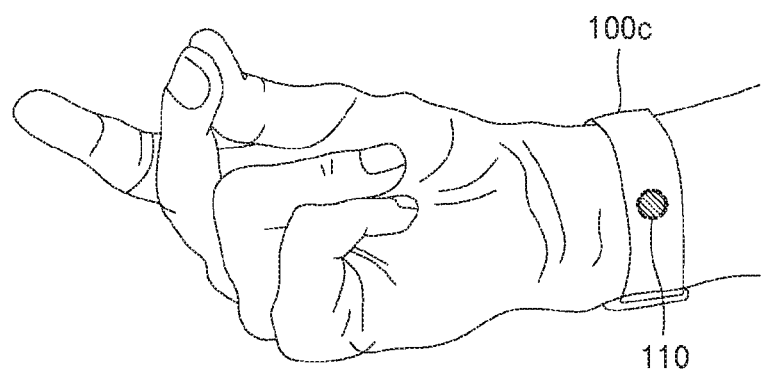
FIG. 25 illustrates a method of controlling the electronic apparatus by using a motion input and a frictional sound input.

FIG. 25 illustrates a method of controlling the electronic apparatus 100c by using both a motion input and a frictional sound input.

According to the present embodiment, when the electronic apparatus 100c uses a frictional sound input including frictional sound generated when the user presses a thumb to a middle finger and moves the middle finger downwards to make the middle finger snap against a palm, the electronic apparatus 100c may detect a motion accompanied with the above frictional sound input and may consider the motion as well as the frictional sound input. For example, only when the frictional sound input, which includes the frictional sound generated when the user presses the thumb to the middle finger and moves the middle finger downwards to make the middle finger snap against the palm, and the motion accompanied with the frictional sound input are detected together, the frictional sound input is determined as being a valid frictional sound input, and a control command corresponding to the frictional sound input may be executed.

Figure 26:
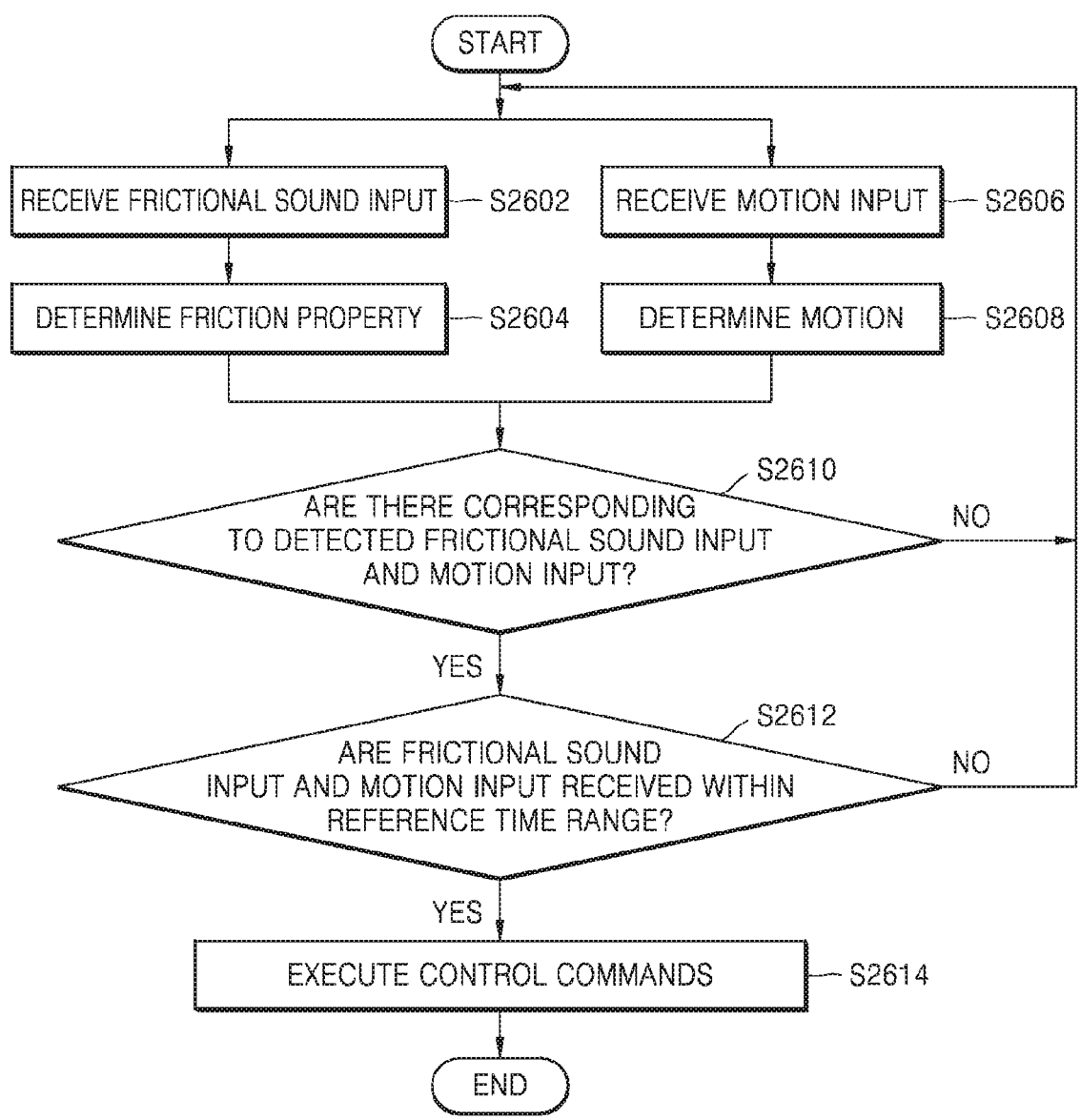
FIG. 26 is a flowchart of a method of controlling the electronic apparatus, according to an embodiment.

The electronic apparatus 100c according to the present embodiment may include the microphone 110 on a surface or an inner side of a component contacting skin. For example, the electronic apparatus 100c of FIG. 21 that is a watch may include the microphone 110 on straps of the watch. According to the present embodiment, since the frictional sound generated by the user's gesture is transmitted through skin tissues and input to the microphone 110, the frictional sound may be detected by the microphone 110 at a strong intensity. According to the present embodiment, an error occurring because sound that is input to the electronic apparatus 100c is identified as a frictional sound input may greatly decrease FIG. 26 is a flowchart of a method of controlling the electronic apparatus 100c, according to an embodiment.

According to the present embodiment, the electronic apparatus 100c uses both a frictional sound input and a motion input. In operation S2602, the electronic apparatus 100c receives the frictional sound input, and in operation S2604, the electronic apparatus 100c determines a frictional property from the frictional sound input. Also, in operation S2606, the electronic apparatus 100c receives a motion input regarding a user's motion, and in operation S2608, the electronic apparatus 100c determines a motion from the received motion input. When the frictional sound input and the motion input are received and determined, the electronic apparatus 100c may determine whether there is a control command corresponding to a combination of the frictional sound input and the motion input, in operation S2610. Also, in operation S2612, the electronic apparatus 100c determines whether the frictional sound input and the motion input are received within the reference time range. The reference time range may be set to be within, for example, 0.5 seconds, 1 second, 5 seconds, and the like. An order of performing operations S2610 and S2612 may change according to embodiments. Operation S2612 may be performed first, and then operation S2610 may be performed. Alternatively, operations S2610 and S2612 may be simultaneously performed.

When there is the control command corresponding to the combination of the frictional sound input and the motion input and when the frictional sound input and the motion input are received within the reference time range, the electronic apparatus 100c may execute a corresponding control command in operation S2614.

Figure 27:
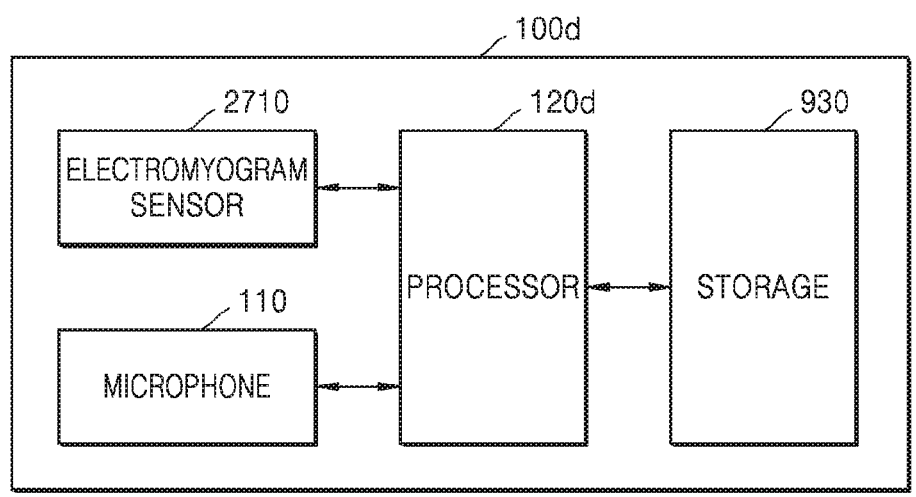
FIG. 27 is a block diagram of a structure of an electronic apparatus, according to an embodiment.

FIG. 27 is a block diagram of a structure of an electronic apparatus 100d, according to an embodiment.

The electronic apparatus 100d according to the present embodiment includes an electromyogram sensor 2710, the microphone 110, the processor 120d, and the storage 930. The electronic apparatus 100d according to the present embodiment includes the electromyogram sensor 2710 and operates by considering a movement of a muscle that is detected by the electromyogram sensor 2710 and the frictional sound input received from the microphone 110.

The electromyogram sensor 2710 is a sensor for detecting movements of muscles and measures an electromyogram to detect movements of muscles. The processor 120d may use an electromyogram input that is a detection value of the electromyogram sensor 2710 and may predict the movements of muscles.

The processor 120d determines whether the electromyogram input received from the electromyogram sensor 2710 and the frictional sound input received from the microphone 110 are received within the reference time range, and whether there is a preset control command regarding a combination of a frictional property of the received frictional sound input and the detected movements of muscles. When the electromyogram input and the frictional sound input are received within the reference time range and when there is the preset control command regarding the electromyogram input and the frictional sound input, the processor 120d may execute a corresponding control command.

Figure 28:
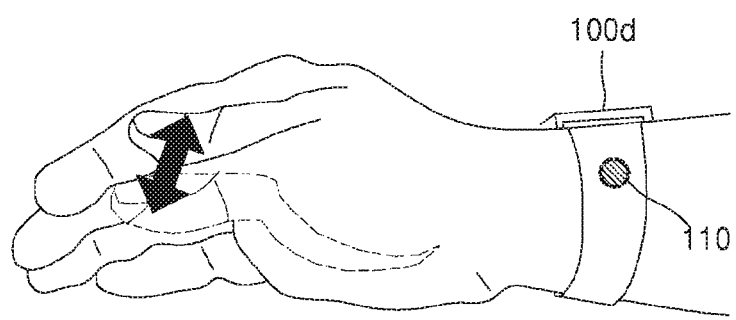
FIG. 28 illustrates a method of controlling the electronic apparatus by using an electromyogram input and the frictional sound input, according to an embodiment.

FIG. 28 illustrates a method of controlling the electronic apparatus 100d by using the electromyogram input and the frictional sound input, according to an embodiment.

According to the present embodiment, when the user wears the electronic apparatus 100d that is a smart watch and generates a frictional sound input by crossing two or more fingers and rubbing them with the a thumb, the microphone 110 included in the electronic apparatus 100d receives the frictional sound input generated by the above gesture. Also, the electronic apparatus 100d according to the present embodiment may use the electromyogram sensor 2710 and receive an electromyogram input indicating a change in an electromyogram that is caused by movements of the thumb. The electronic apparatus 100d may consider the frictional sound input and the electromyogram input and thus may greatly decrease a possibility of malfunction, compared to a case where only the frictional sound input is used.

Figure 29:
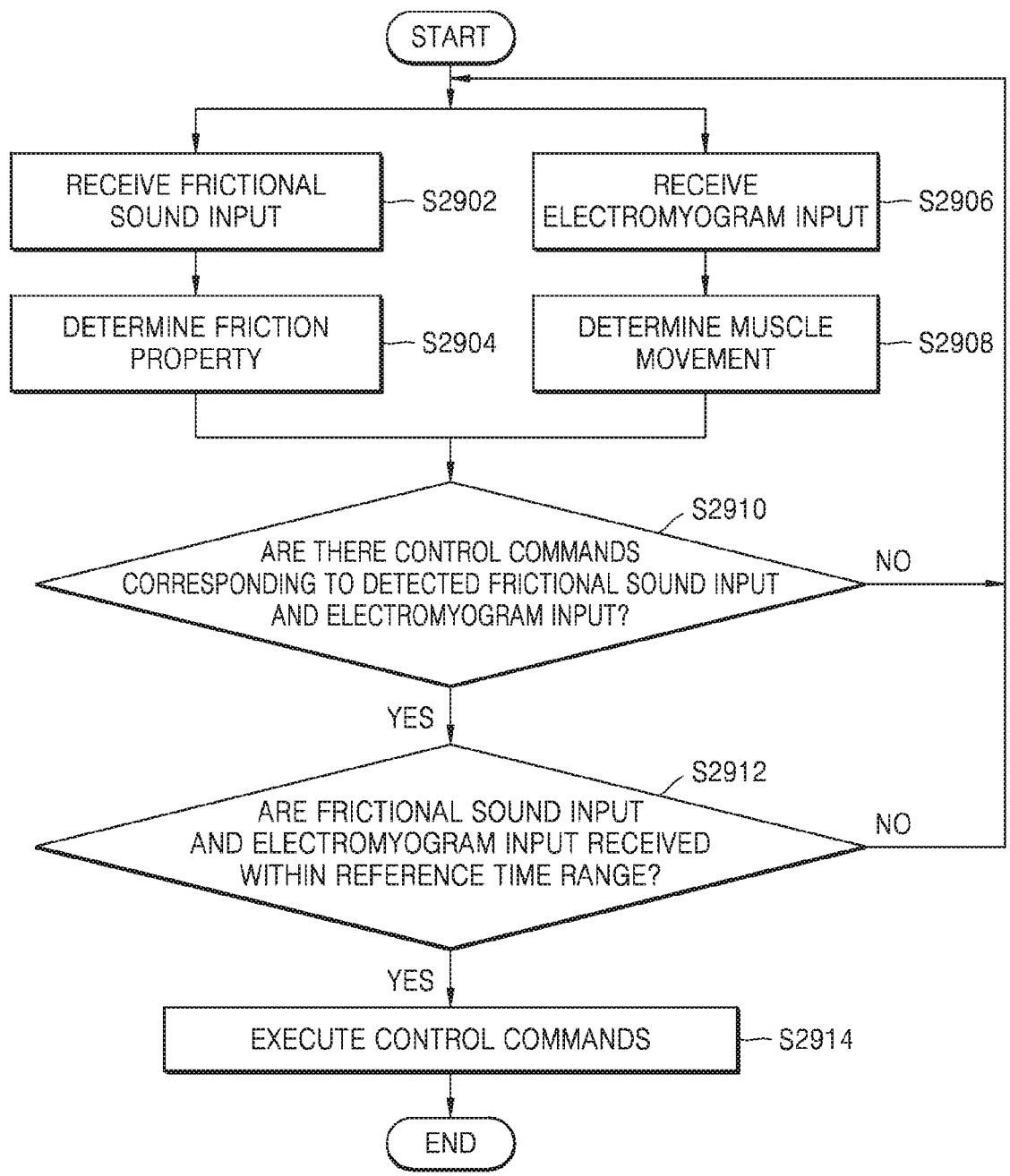
FIG. 29 is a flowchart of a method of controlling an electronic apparatus, according to an embodiment.

FIG. 29 is a flowchart of a method of controlling the electronic apparatus 100d, according to an embodiment.

According to the present embodiment, the electronic apparatus 100d may use both a frictional sound input and an electromyogram input. In operation S2902, the electronic apparatus 100d may receive the frictional sound input, and in operation S2904, the electronic apparatus 100d may determine a frictional property from the frictional sound input. Also, in operation S2906, the electronic apparatus 100d may receive the electromyogram input regarding a movement of a muscle of the user, and in operation S2908, the electronic apparatus 100d may determine the detected movement of the muscle. When the frictional sound input and the electromyogram input are received and determined, the electronic apparatus 100d may determine whether there is a control command corresponding to a combination of the frictional sound input and the electromyogram input in operation S2910. Also, in operation S2912, the electronic apparatus 100d may determine whether the frictional sound input and the electromyogram input are received within the reference time range. The reference time range may be set to be within, for example, 0.5 seconds, 1 second, 5 seconds, and the like. An order of performing operations S2910 and S2912 may change according to embodiments. Operation S2912 may be performed first, and then operation S2910 may be performed. Alternatively, operations S2910 and S2912 may be simultaneously performed.

When there is the control command corresponding to the combination of the frictional sound input and the electromyogram input and when the frictional sound input and the electromyogram input are received within the reference time range, the electronic apparatus 100d may execute the control command in operation S2914.

Figure 30:
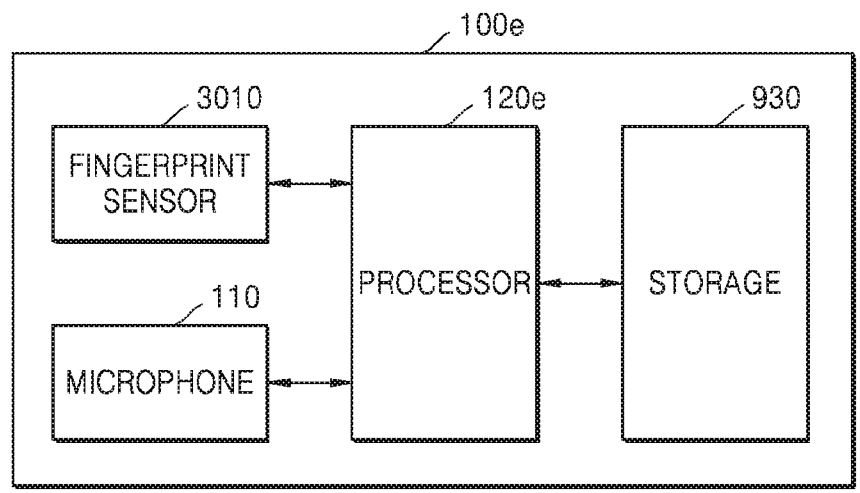
FIG. 30 is a block diagram of a structure of an electronic apparatus, according to an embodiment.

FIG. 30 is a block diagram of a structure of an electronic apparatus 100e, according to an embodiment.

The electronic apparatus 100e according to the present embodiment includes a fingerprint sensor 3010, the microphone 110, a processor 120e, and the storage 930. According to the present embodiment, the electronic apparatus 100e includes the fingerprint sensor 3010 and operates by considering a fingerprint input received from the fingerprint sensor 3010 as well as a frictional sound input received from the microphone 110.

The fingerprint sensor 3010 is a sensor for detecting fingerprints and obtains image information of the fingerprints. The image information may be obtained in various manners such as an optical manner, a semiconductor device manner of detecting capacitance or electrical conduction, an ultrasound manner, a heat detection manner, a non-contact manner, or a combination thereof. According to an embodiment, after the processor 120e extracts a characteristic of the fingerprint from the image information of the fingerprint, the processor 120e compares the characteristic with characteristic information of the user who is registered in advance and matches the characteristic with the characteristic information, thereby identifying the user. According to an embodiment, the processor 120e determines whether the image information of the fingerprint is the fingerprint and does not perform user identification.

The processor 120e determines whether the fingerprint input received from the fingerprint sensor 3010 and the frictional sound input received from the microphone are received within the reference time range, and whether there is a control command that is preset for a combination of the received fingerprint input and a frictional property of the received frictional sound input. When the fingerprint input and the frictional sound input are received within the reference time range and when there is the control command regarding the fingerprint input and the frictional sound input, the control command is executed.

Figure 31:
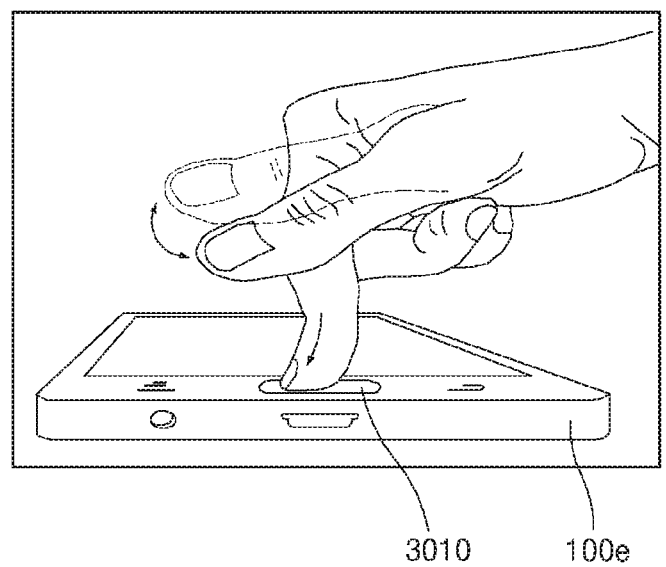
FIG. 31 illustrates a method of controlling an electronic apparatus by using a fingerprint input and a frictional sound input, according to an embodiment.

FIG. 31 illustrates a method of controlling the electronic apparatus 100e by using a fingerprint input and a frictional sound input, according to an embodiment.

According to the present embodiment, the fingerprint sensor 3010 is at a certain location of the electronic apparatus 100e, and the user may generate the frictional sound input by rubbing a finger with another finger while the user touches the fingerprint sensor 3010 with a tip of the finger. The fingerprint sensor 3010 obtains image information of a fingerprint while the user touches the fingerprint sensor 3010 with the tip of the finger. Also, the microphone 110 included in the electronic apparatus 100e receives the frictional sound input.

According to an embodiment, the processor 120e may perform an operation corresponding to a combination of a frictional property of the frictional sound input and user identification information that is obtained from the fingerprint input. For example, the processor 120e may perform user authentication by using the combination of the user identification information that is obtained from the fingerprint input with a preset frictional property. According to the present embodiment, the security of the electronic apparatus 100e may be improved, compared to a case where only a fingerprint is used.

According to another embodiment, the processor 120e may perform the user authentication based on the user identification information that is obtained from the fingerprint input and may determine which control command is to be performed, based on a frictional property of the frictional sound input. For example, while touching the fingerprint sensor 3010 with the tip of the finger, a user who is registered in advance may change a mode of the electronic apparatus 100e from a sleep mode to an activation mode by using a first frictional sound input and may access contact information of the electronic apparatus 100e by using a second frictional sound input.

According to another embodiment, the processor 120e may determine whether an image of a fingerprint is a fingerprint and determine a frictional property of the frictional sound input. When the image of the fingerprint is the fingerprint and there is a control command corresponding to the frictional property, the control command may be executed. According to the present embodiment, a probability of malfunction may be greatly decreased, compared to a case where only the frictional sound input is considered.

Figure 32:
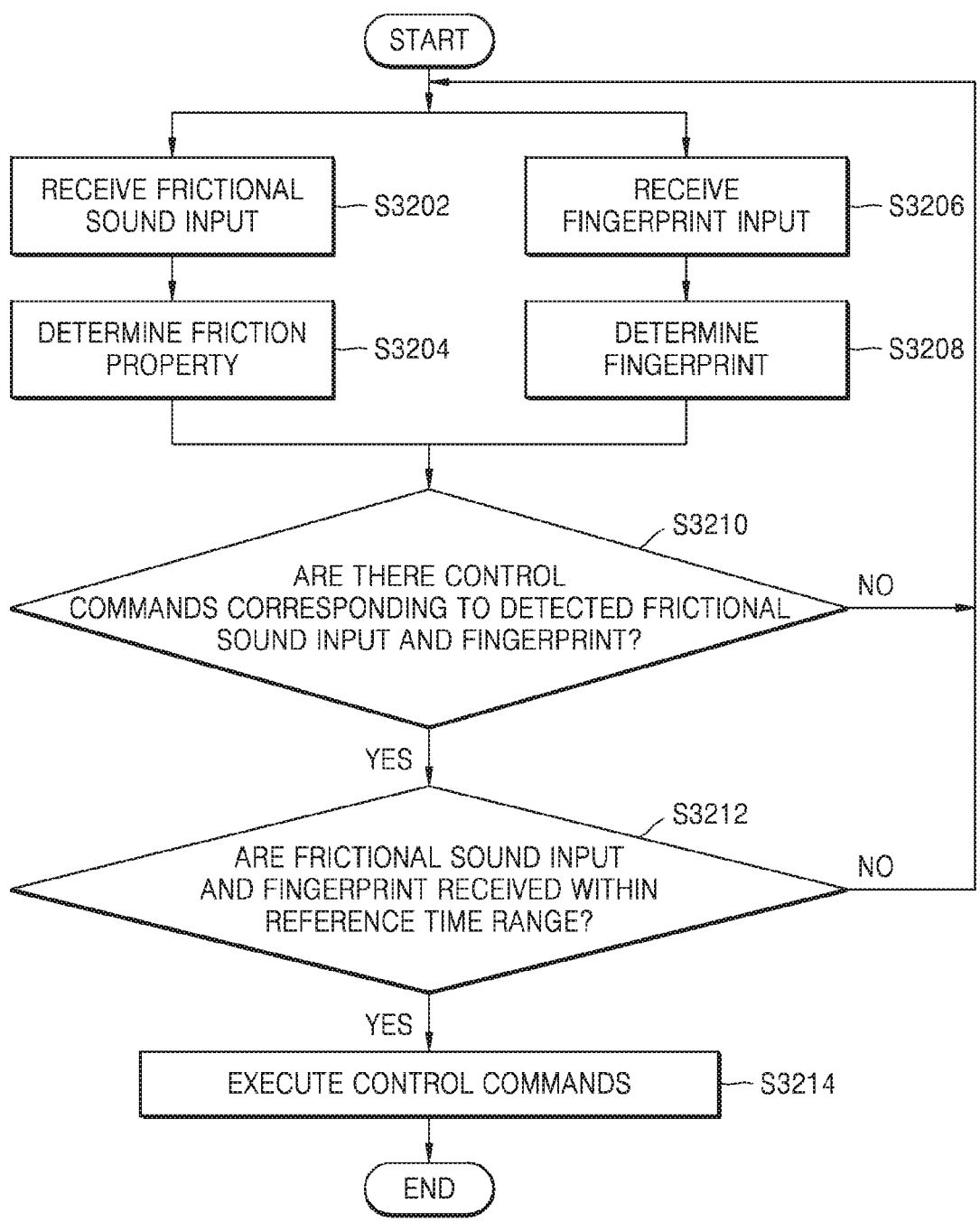
FIG. 32 is a flowchart of a method of controlling an electronic apparatus, according to an embodiment.

FIG. 32 is a flowchart of a method of controlling the electronic apparatus 100e, according to an embodiment.

According to the present embodiment, the electronic apparatus 100e uses both a frictional sound input and a fingerprint input. In operation 53202, the electronic apparatus 100e receives the frictional sound input. In operation 53204, the electronic apparatus 100e determines a frictional property from the frictional sound input. Also, in operation 53206, the electronic apparatus 100e receives the fingerprint input of the user, and in operation 53208, the electronic apparatus 100e determines the received fingerprint input. Operation 53208 of determining the fingerprint input may be an operation of identifying the user by using the fingerprint input or an operation of verifying whether the fingerprint input is a fingerprint. In operation 53210, when the frictional sound input and the fingerprint input are received and determined, the electronic apparatus 100e determines whether a control command corresponding to a combination of the frictional sound input and the fingerprint input exists. Also, in operation 53212, the electronic apparatus 100e determines whether the frictional sound input and the fingerprint input are received within the reference time range. An order of performing operations 53210 and 53212 may change according to embodiments. Operation 53212 may be performed first, and then operation 53210 may be performed. Alternatively, operations 53210 and 53212 may be simultaneously performed.

When the control command corresponding to the combination of the frictional sound input and the fingerprint input exists and the frictional sound input and the fingerprint input are received within the reference time range, the electronic apparatus 100e may execute the control command in operation 53214.

FIGS. 33 to 37 illustrate examples in which the electronic apparatus 100 that is a smart watch uses frictional sound inputs.

Figure 33:
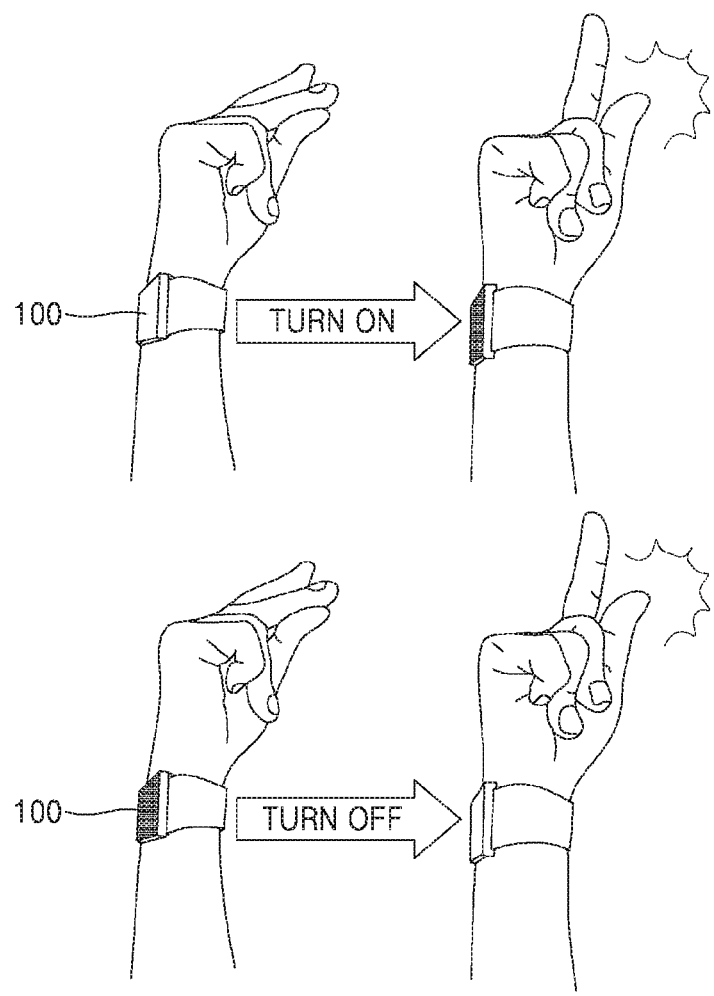
FIG. 33 illustrates control commands of turning on and off an electronic apparatus that is a smart watch, according to an embodiment.

FIG. 33 illustrates control commands of turning on and off the electronic apparatus 100 that is the smart watch, according to an embodiment.

According to the present embodiment, the smart watch may be turned on or off by using a frictional sound input including frictional sound generated when the user presses a thumb to a middle finger and moves the middle finger downwards to make the middle finger snap against a palm. In the present embodiment, as described above, a motion input or an electromyogram input may be used together with the frictional sound input.

Figure 34:
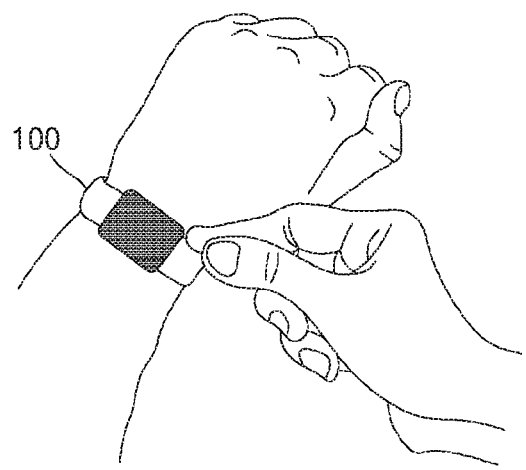
FIG. 34 illustrates a gesture of generating a frictional sound input while a finger contacts the electronic apparatus that is the smart watch, according to an embodiment.

FIG. 34 illustrates a gesture of generating a frictional sound input while a finger contacts the electronic apparatus 100 that is the smart watch, according to an embodiment.

According to the present embodiment, while touching the smart watch with a finger, the user may generate a frictional sound input having a preset frictional property and control the electronic apparatus 100. For example, by using the frictional sound input having the preset frictional property, the user may convert a mode of the electronic apparatus 100 from a sleep mode, in which a screen of the smart watch is off or a standby screen is displayed, to a wakeup mode in which a menu is displayed or a screen of a function performed on the smart watch is displayed. Also, the user may move to a home screen of the smart watch by using the frictional sound input having the preset frictional property. In addition, the user may adjust brightness of the display of the smart watch by using the frictional sound input having the preset frictional property. The user may adjust volume of a sound output of the smart watch by using the frictional sound input having the preset frictional property. The user may adjust haptic sensitivity by using the frictional sound input having the preset frictional property. Moreover, the user may perform screen scrolling, screen switching, selecting a menu or an object, moving an object, zooming in, and zooming out by using the frictional sound input having the preset frictional property. The user may view content by adjusting screen scroll speed and sliding the screen by using the frictional sound input having the preset frictional property. The user may select an application, change an application, change a screen to a clock screen, and display a recently-executed application by using the frictional sound input having the preset frictional property. The user may enter a certain mode such as voice recognition mode or a capturing mode by using the frictional sound input having the preset frictional property. The user may adjust time on a clock by using the frictional sound input having the preset frictional property. The user may select, turn on or off, or snooze an alarm or may set, stop or terminate a timer by using the frictional sound input having the preset frictional property. The user may read received messages, open content included in the messages, or answer the messages by using the frictional sound input having the preset frictional property. The user may read emails by using the frictional sound input having the preset frictional property. The user may answer or block calls, adjust volume of calls, or make calls by using the frictional sound input having the preset frictional property. The user may enter a response, e.g., checking or delaying a notification, to a notification from the smart watch by using the frictional sound input having the preset frictional property. The user may control a sports-related function of the smart watch by using the frictional sound input having the preset frictional property. The user may scroll, rotate, zoom in, or zoom out maps or may obtain information about a certain location by using the frictional sound input having the preset frictional property. The user may input commands such as playing music, stopping music, playing a next song, playing a previous song, and adjusting volume by using the frictional sound input having the preset frictional property. The user may browse, zoom in, zoom out, rotate, and transmit pictures on the smart watch by using the frictional sound input having the preset frictional property. The user may use the frictional sound input having the preset frictional property as a shortcut key regarding a certain function. The user may adjust a text size on the smart watch by using the frictional sound input having the preset frictional property. Other than the above examples, control of various electronic apparatuses may be included in the scope of the present disclosure by using the frictional sound input. The frictional sound input according to the embodiments may be input to the electronic apparatus 100 even when the user does not wear the smart watch.

Figure 35:
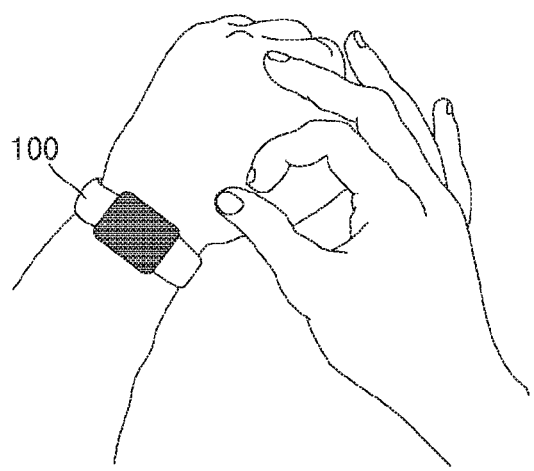
FIG. 35 illustrates a gesture of generating a frictional sound input while a finger is placed around the electronic apparatus that is the smart watch, according to an embodiment.

FIG. 35 illustrates a gesture of generating a frictional sound input while a finger is placed around the electronic apparatus 100 that is the smart watch, according to an embodiment.

According to the present embodiment, the user may input the frictional sound input to the smart watch by placing a finger around the smart watch and making a gesture of generating a frictional sound input. According to an embodiment, the user may make the gesture of generating a frictional sound input while contacting the hand or an arm, on which the smart watch is worn, with a finger of the other hand. The user may input the frictional sound inputs corresponding to the above operations described with reference to FIG. 34 to the smart watch without touching the smart watch with the hand as illustrated in FIG. 31.

Figure 36:
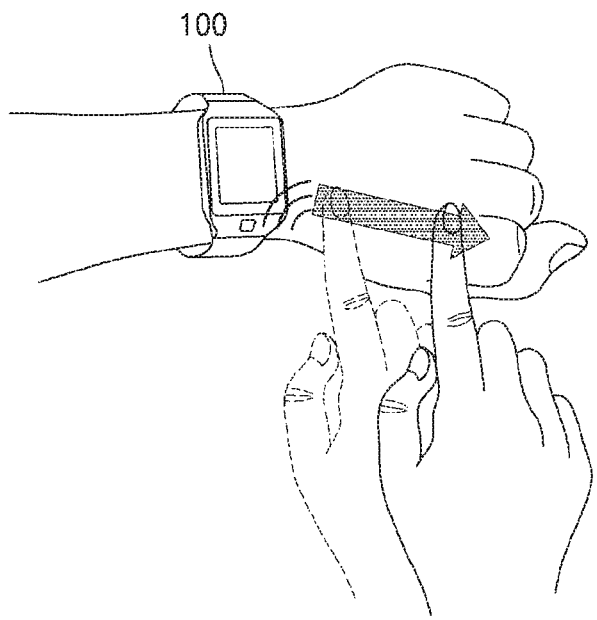
FIG. 36 illustrates a gesture of generating a frictional sound input while a finger is placed around the electronic apparatus that is the smart watch, according to an embodiment.

FIG. 36 illustrates a gesture of generating a frictional sound input while a finger is placed around an electronic apparatus 100 that is a smart watch, according to an embodiment.

According to an embodiment, the user may generate a frictional sound input by rubbing the back of a hand on which the electronic apparatus 100 that is the smart watch is worn, with a finger of the other hand. For example, the electronic apparatus 100 may execute a control command, e.g., a control command of flipping a page in accordance with a frictional sound input of rubbing the back of the hand with the finger or a control command of changing a sleep mode of the electronic apparatus 100 to an activation mode thereof in accordance with a frictional sound input of tapping the back of the hand with the finger.

Figure 37:
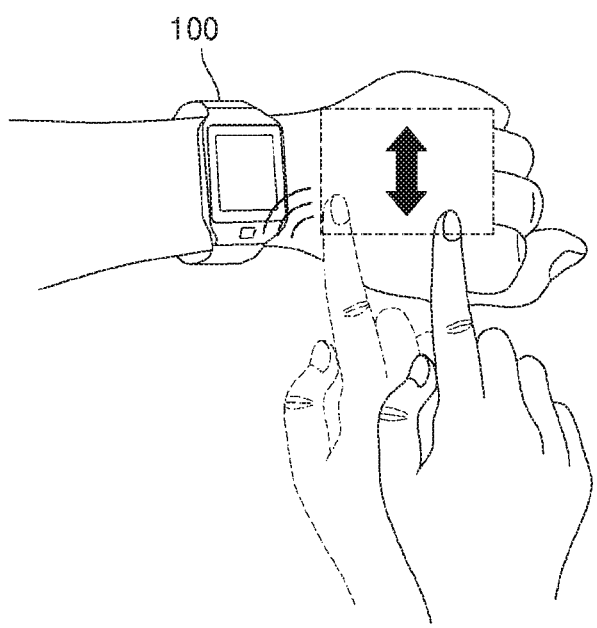
FIG. 37 illustrates a gesture of generating a frictional sound input while a finger is placed around the electronic apparatus that is the smart watch, according to an embodiment.

FIG. 37 illustrates a gesture of generating a frictional sound input while a finger is placed around an electronic apparatus 100 that is a smart watch, according to an embodiment.

According to an embodiment, the electronic apparatus 100 includes a projector and projects a GUI image onto a body part by using the projector. Based on the GUI image projected onto the body part, the user may generate a frictional sound input.

According to an embodiment, the user may control the GUI image to be projected from the projector included in the electronic apparatus 100 onto the back of a hand through a preset input.

The preset input may be defined as one of various inputs such as a touch input using a touch screen of the electronic apparatus 100, a touch input using a touch sensor, a button pressing input, a gesture input by moving the electronic apparatus 100, and a frictional sound input. When the GUI image is projected from the projector onto the back of the hand, the frictional sound input is generated by tapping the back of the hand in a certain manner, rubbing the back in a certain direction, etc. For example, in a state in which the GUI image is projected onto the back of the hand as illustrated in FIG. 33, the user may scroll upwards an image displayed on a display of the electronic apparatus 100 through the frictional sound input of rubbing the back of the hand upwards, or may scroll downwards the image though the frictional sound input of rubbing the back of the hand downwards. On the GUI image projected from the projector, an object capable of inputting various control commands such as a scroll icon, a dial icon, a pushing icon, etc. may be displayed.

Figure 38:
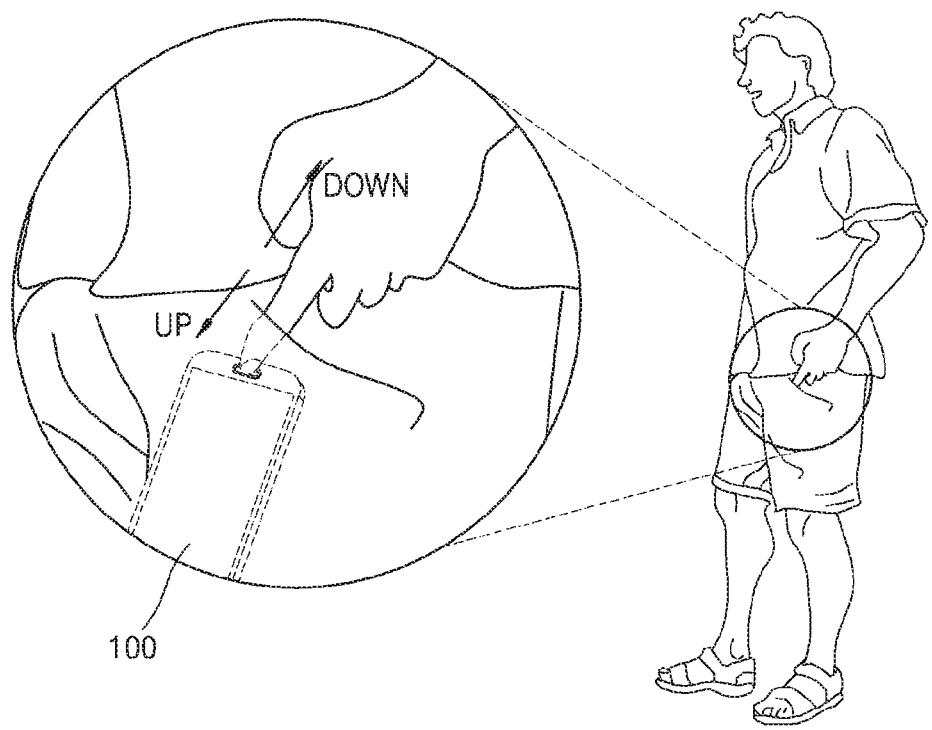
FIG. 38 illustrates a gesture of controlling an electronic apparatus by using a frictional sound input, according to an embodiment.

FIG. 38 illustrates a gesture of controlling an electronic apparatus 100 by using a frictional sound input, according to an embodiment.

According to the present embodiment, the user may control the electronic apparatus 100 by using the frictional sound input when the electronic apparatus 100 is in a pocket, a bag, or the like of the user. For example, the user may use a frictional sound input of a first type to decrease volume of music being played and may use a frictional sound input of a second type to increase the volume of the music being played. According to an embodiment, the electronic apparatus 100 may use an illumination sensor and a proximity sensor to detect a state in which the electronic apparatus 100 is in the packet, the bag, or the like. While the electronic apparatus 100 is in the packet, the bag, or the like, noise removal performance is improved to improve performance of detecting the frictional sound input. For the improvement of the noise removal performance, a signal characteristic of noise detected while the electronic apparatus 100 is in the packet, the bag, or the like, is stored in advance, and while the electronic apparatus 100 is in the packet, the bag, or the like, the noise removal performance may be improved based on the stored signal characteristic. According to the present embodiment, the user may easily control the electronic apparatus 100 without looking at the electronic apparatus 100. For example, according to the present embodiment, while placing the electronic apparatus 100 in the pocket, the bag, or the like, the user may easily control the electronic apparatus 100 by generating the frictional sound input with the hand. Therefore, according to the present embodiment, the user convenience may be greatly increased.

Figure 39:
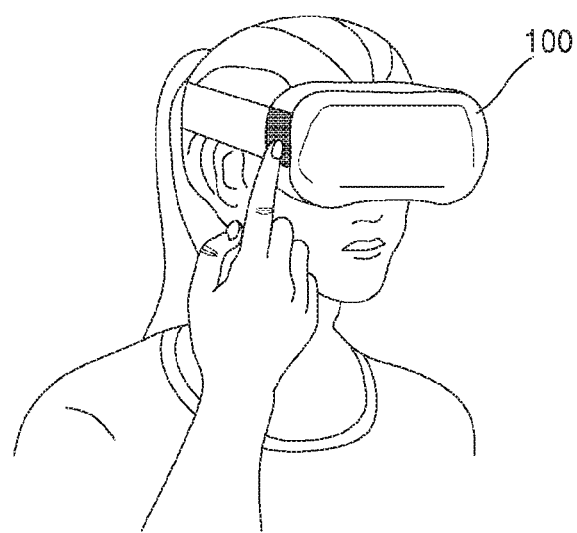
FIG. 39 illustrates a gesture of controlling an electronic apparatus that is a virtual reality (VR) device, according to an embodiment.

FIG. 39 illustrates a gesture of controlling an electronic apparatus that is a virtual reality (VR) device, according to an embodiment.

Due to a structure of the VR device, the VR device has a limited space for an input device such as a touch screen or a key pad. According to the present embodiment, when a frictional sound input is used by the electronic apparatus 100 that is the VR device, an input device may be implemented as a small microphone, and thus, the input device may be included in the VR device without a spatial limitation.

Also, when the user wears the VR device and makes a gesture of generating a touch input by using a touch pad, or the like, the gesture is easily viewed from the outside. Thus, when the user makes a gesture on the touch pad of the VR device, security of the VR device is weakened. A gesture of generating a certain frictional property by using a finger or the like is difficult to be accurately identified by other people. Thus, according to the present embodiment, as the electronic apparatus 100 that is the VR device uses the frictional sound input, the security of the electronic apparatus 100 may be improved.

Also, when the user wants to make a gesture of generating a touch input by using the touch pad, the user needs to make the gesture by moving a hand to the touch pad and accurately touching the touch pad. However, it is difficult for the user to find a location of the touch pad outside the VR device while the user wears the VR device, user inconvenience may be caused. According to the present embodiment, the user may make a gesture of generating a frictional sound input while touching an arbitrary location of the VR device or a gesture of generating a frictional sound input in a vicinity (e.g., within a 2-cm radius) of a location where a microphone is located, and thus, the user may easily generate an input compared to a case where the user uses the touch pad.

Figure 40:
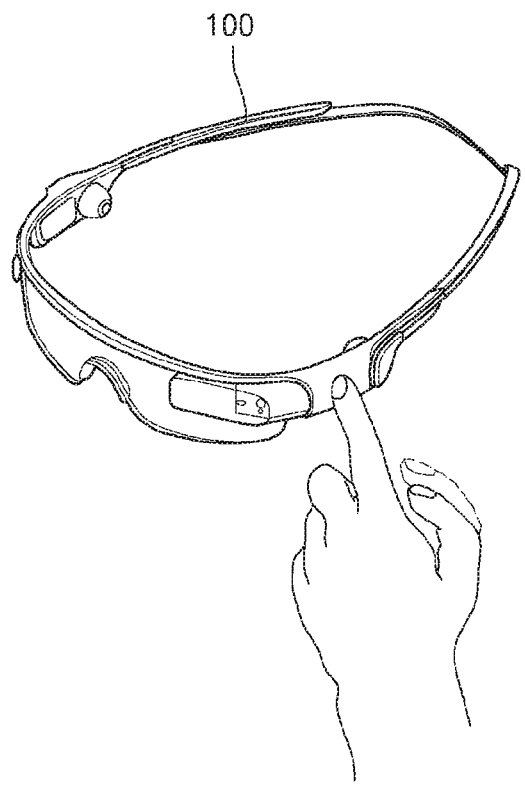
FIG. 40 illustrates a gesture of controlling an electronic apparatus that is smart glasses, according to an embodiment.

FIG. 40 illustrates a gesture of controlling an electronic apparatus 100 that is smart glasses, according to an embodiment.

According to an embodiment, the electronic apparatus 100 that is the smart glasses may use a frictional sound input. For example, the user may make a gesture of generating a frictional sound input by touching the smart glasses or a gesture of generating a frictional sound input in a vicinity (e.g., within a 2-cm radius) of a location where a microphone is located. According to the present embodiment, similar to a case where a VR device generates a frictional sound input, an input device is included in the smart glasses without a spatial limitation, the security of the smart glasses may be improved, and an input may be easily generated without the user having to find a location on the touch pad.

Figure 41:
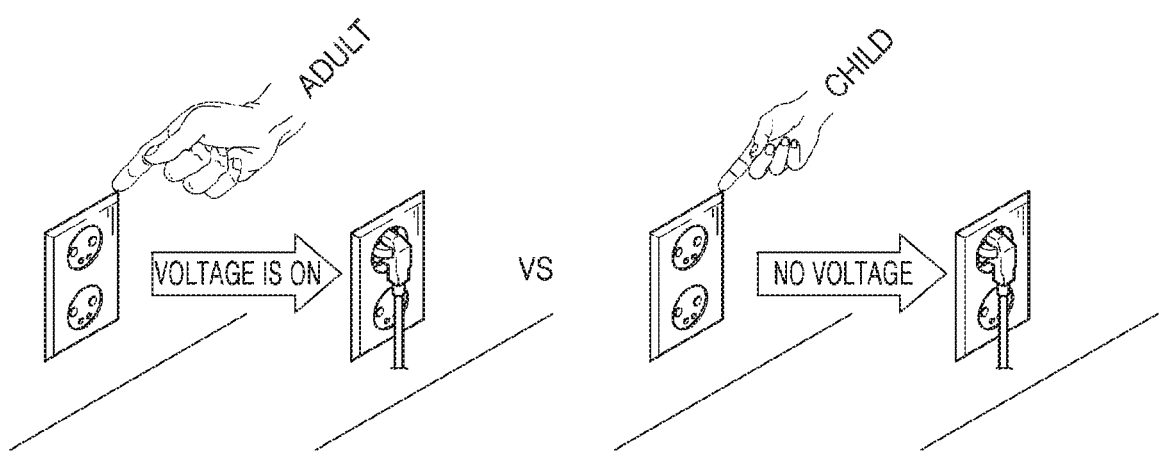
FIG. 41 illustrates a gesture of controlling an electronic apparatus that is a power outlet, according to an embodiment.

FIG. 41 illustrates a gesture of controlling an electronic apparatus 100 that is a power outlet, according to an embodiment.

According to an embodiment, the electronic apparatus 100 that is the power outlet may perform user authentication by using a frictional sound input. For example, when the power outlet is turned off and when the user touches the electronic apparatus 100 that is the power outlet with a hand and makes a gesture corresponding to a preset frictional property, the power outlet is turned on. When a plug is fitted into the power outlet while the power outlet is on, a current may flow. Also, according to an embodiment, when the user removes the plug from the power outlet, the power outlet is turned off, and when the power outlet is off, a current does not flow even though the plug is fitted into the power outlet. According to the present embodiment, an electric shock, which may occur when a child contacts the power outlet, may be prevented.

Figure 42:
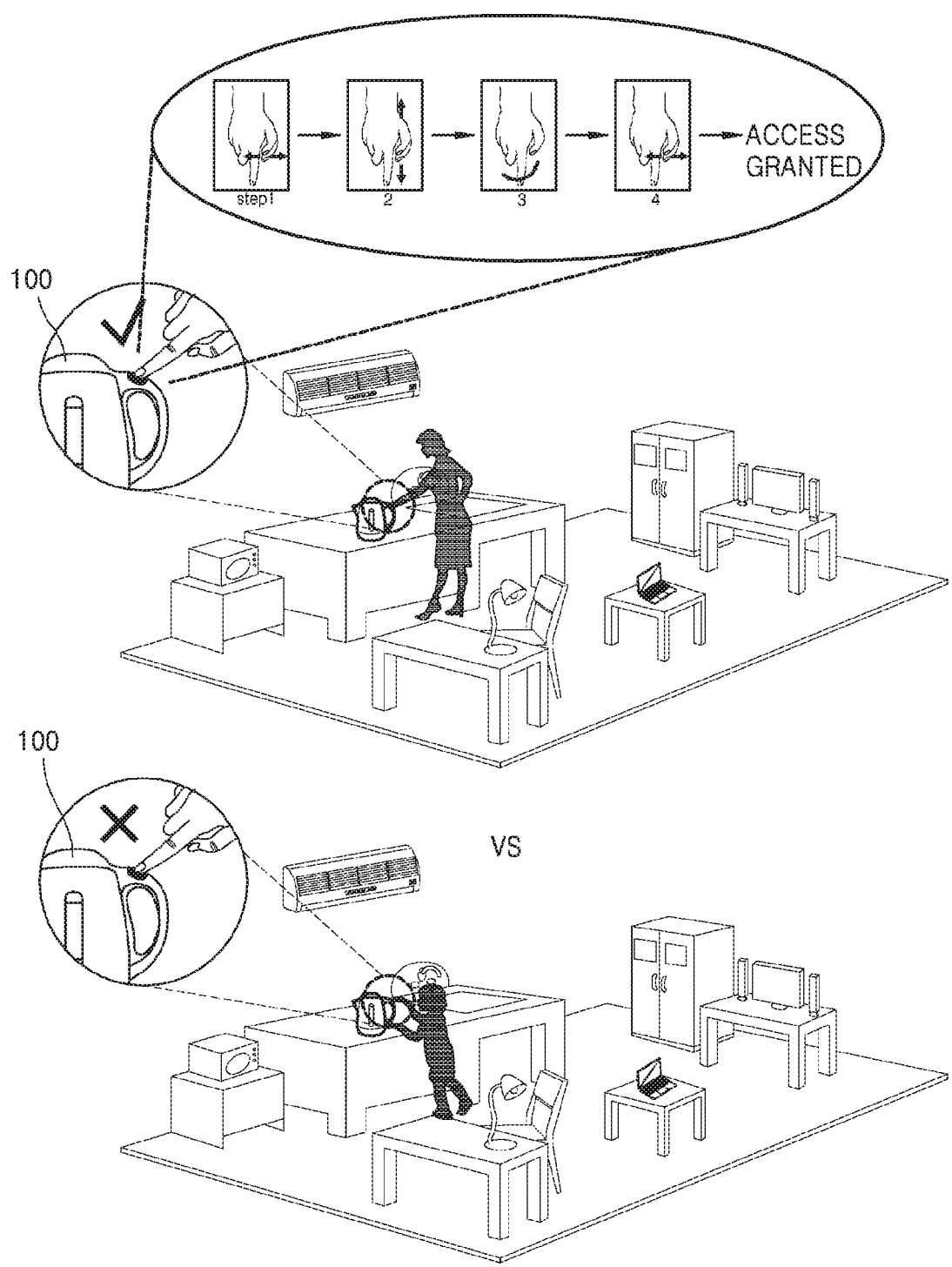
FIG. 42 illustrates a gesture of controlling an electronic apparatus that is a heating appliance.

FIG. 42 illustrates a gesture of controlling the electronic apparatus 100 that is a heating appliance.

According to an embodiment, user authentication may be performed on the electronic apparatus 100 that is the heating appliance, by using a frictional sound input. The heating appliance includes, for example, electric kettles, electric heating instruments, ovens, gas stoves, coffeemakers, and the like. For example, when a frictional sound input corresponding to a certain frictional property is input to the heating appliance, the heating appliance may be turned on. According to the present embodiment, an accident, which may occur when a child manipulates a heating appliance, may be prevented.

According to an embodiment, the electronic apparatus 100 that is the heating appliance may be controlled by using the frictional sound input. For example, by using the frictional sound input, the user may perform, on the heating appliance, control such as adjusting a temperature of the heating appliance, turning on or off the heating appliance, and changing a mode of the heating appliance. It is difficult for the user to control the heating appliance being heated up by touching the heating appliance with a hand, and according to the present embodiment, the user places a hand around the heating appliance without directly touching the same and then generates a frictional sound input to control the heating appliance, thereby improving the safety of the heating appliance.

Figure 43:
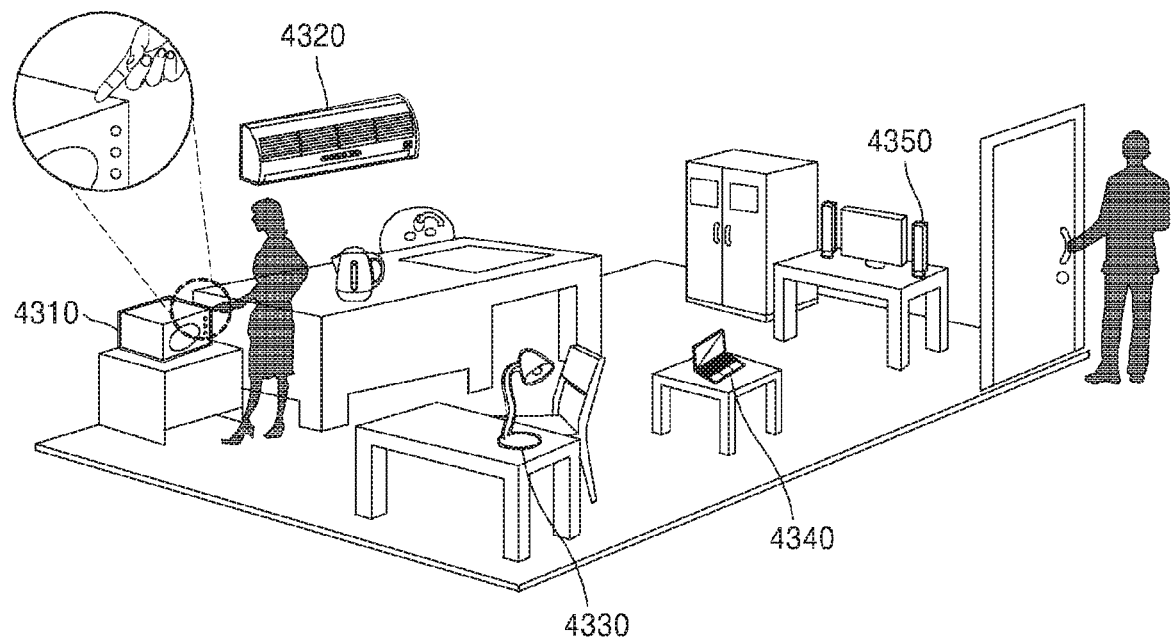
FIG. 43 illustrates a gesture of controlling electronic apparatuses that are home appliances, according to an embodiment.

FIG. 43 illustrates a gesture of controlling the electronic apparatus 100 that is home appliances, according to an embodiment.

According to the present embodiment, various home appliances may be controlled by using frictional sound inputs. According to an embodiment, the user may perform control, for example, turning on or off, adjusting time, setting a mode, or the like, on a microwave 4310 by using the frictional sound inputs. According to an embodiment, the user may perform control, for example, turning on or off, adjusting temperature, adjusting a wind direction, setting a timer, or the like, on an air conditioner 4320 by using the frictional sound inputs. According to an embodiment, the user may perform control, for example, turning on or off, adjusting brightness, or the like, on a lamp 4330 by using the frictional sound inputs.

According to an embodiment, the user may perform control, for example, turning on or off, mode conversion, or the like, on a laptop 4340 by using the frictional sound inputs. Only when a frictional sound input having a preset frictional property is input to the laptop 4340 and a set-top box according to an embodiment, a mode of the laptop 4340 is changed to an adult mode in which adult content is accessible, and thus minors may be prevented from accessing the adult content.

According to an embodiment, the user may perform control, for example, turning on or off, adjusting volume, or the like, on a speaker 4350 by using the frictional sound inputs.

According to an embodiment, the user may perform control such as lock/unlock of an electronic door lock 4360 by using the frictional sound inputs. According to an embodiment, a microphone is at a certain location of the electronic door lock 4360, but the location of the microphone is not identified outside the electronic door lock 4360. Thus, only the user who knows the location of the electronic door lock 4360 is able to lock or unlock the electronic door lock 4360, thereby reinforcing security of the electronic door lock 4360.

According to the present embodiment, home appliances may be easily controlled by using a simple gesture of generating a frictional sound input while the user is touching the home appliances, and thus user convenience increases.

Figure 44:
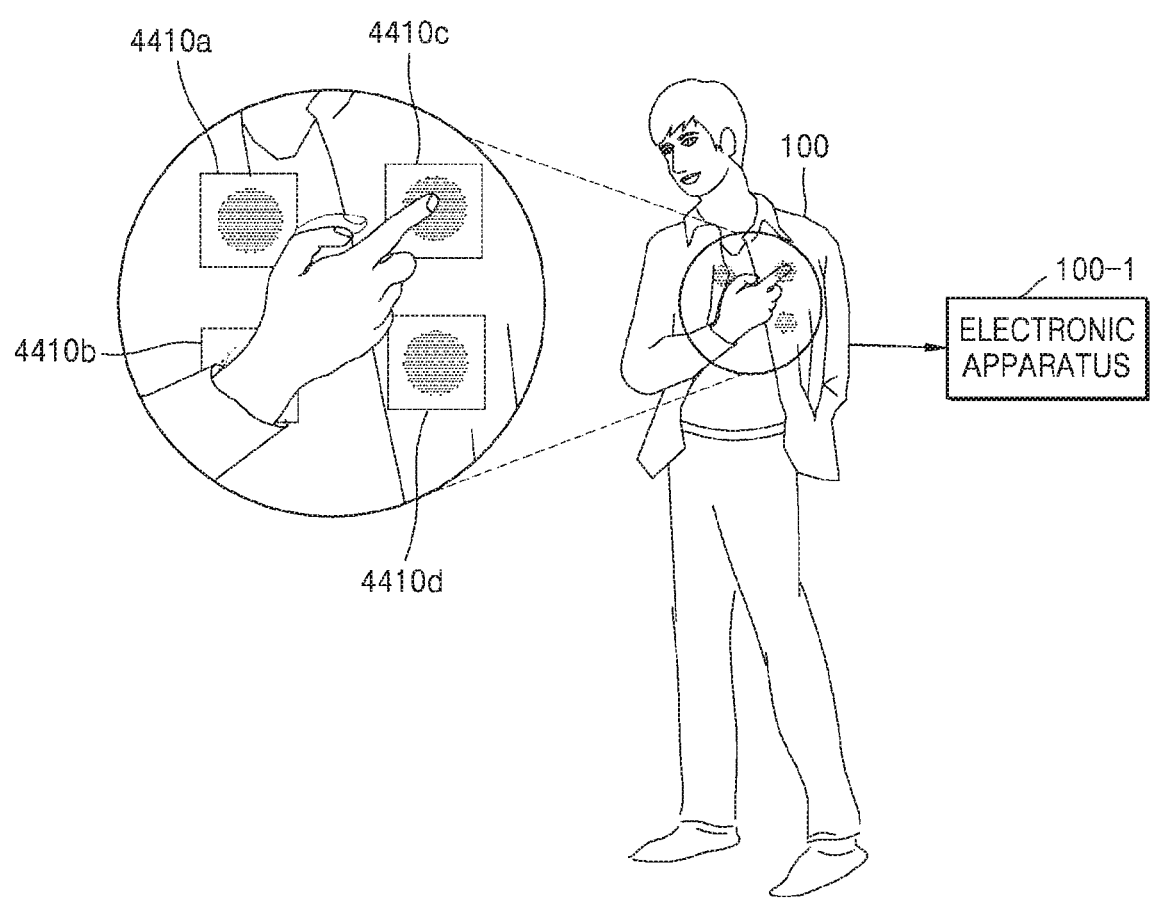
FIG. 44 illustrates a gesture of controlling an electronic apparatus that is smart textiles, according to an embodiment.

FIG. 44 illustrates a gesture of controlling the electronic apparatus 100 that is smart textiles, according to an embodiment.

According to the present embodiment, the electronic apparatus 100 that is smart textiles includes microphones, and the user may control the electronic apparatus 100 that is the smart textiles by using frictional sound inputs. For example, the microphones are arranged in certain areas 4410*a*, 4410*b*, 4410*c*, and 4410*d* of the smart textiles, and the user generates the frictional sound inputs by touching, with a finger, the areas 4410*a* to 4410*d* or placing a finger around the areas 4410*a* to 4410*d* so that the user may control the smart textiles.

According to an embodiment, the microphones are respectively arranged in areas 4410*a* to 4410*d*, and the smart textiles may execute a different control commands according to which one of the areas 4410*a* to 4410*d* receives the frictional input. For example, when a frictional sound input is received in the first area 4410*a*, a control command of measuring heart rates may be executed on the smart textiles, and when a frictional sound input is received in the second area 4410*b*, a control command of measuring body temperature may be executed on the smart textiles.

The smart textiles according to an embodiment may receive the frictional sound inputs from the user and transmit the received frictional sound inputs to another electronic apparatus (100-1, for example, a smart phone, a smart watch, smart glasses, a tablet PC, etc.). According to the present embodiment, the user may easily control the electronic apparatus 100-1 in a pocket or a bag by using the smart textiles. Also, according to the present embodiment, the user may use the smart textiles to easily control the electronic apparatus 100-1, for example, a smart watch or smart glasses, which has a relatively small area assigned to the input device.

Figure 45:
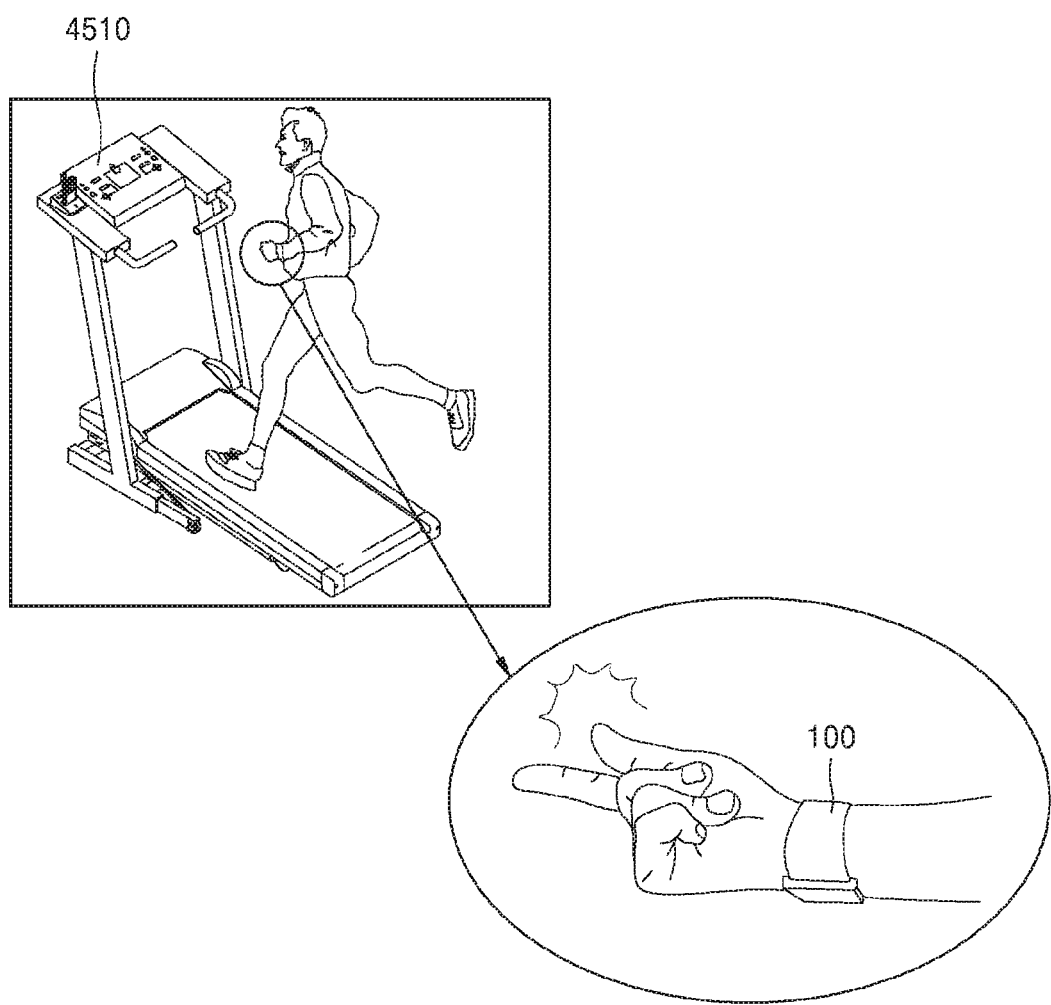
FIG. 45 illustrates a gesture of controlling an exercise machine by using an electronic apparatus that is a wearable device, according to an embodiment.

FIG. 45 illustrates a gesture of controlling an exercise machine 4510 by using the electronic apparatus 100 that is a wearable device, according to an embodiment.

According to an embodiment, the user may transmit a frictional sound input to the electronic apparatus 100 that is the wearable device and control the exercise machine 4510. For example, while wearing the electronic apparatus 100 that is a smart watch, the user may generate a frictional sound input and perform control such as turning on or off, adjusting speed, adjusting a gradient of the treadmill, or the like. According to the present embodiment, the electronic apparatus 100 that is the wearable device may include a communication device communicating with the exercise machine 4510 and may communicate with the exercise machine 4510 in a wired or wireless manner.

According to an embodiment, the exercise machine 4510 includes a microphone, and the user may control the exercise machine 4510 by using the frictional sound input. The exercise machine 4510 may determine a frictional property of the frictional sound input that is input via the microphone, compare the determined frictional property with a previously stored frictional property, and execute a control command assigned to the corresponding frictional property.

Figure 46:
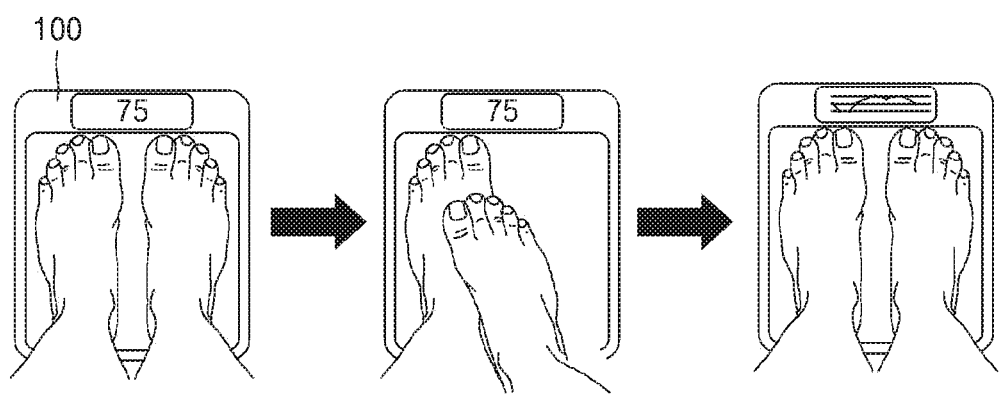
FIG. 46 illustrates a gesture of controlling an electronic apparatus that is a scale by using a frictional sound input, according to an embodiment.

FIG. 46 illustrates a gesture of controlling an electronic apparatus 100 that is a scale by using a frictional sound input, according to an embodiment.

According to the present embodiment, the user may generate a frictional sound input with feet and control the electronic apparatus 100 that is the scale. For example, while stepping on the scale, the user may generate a frictional sound input by rubbing the top of a foot with the other foot and control the scale. According to an embodiment, the electronic apparatus 100 that is the scale may execute control commands, for example, turning on or off of the scale, displaying a weight change, measuring body fat, user settings, and the like.

Figure 47:
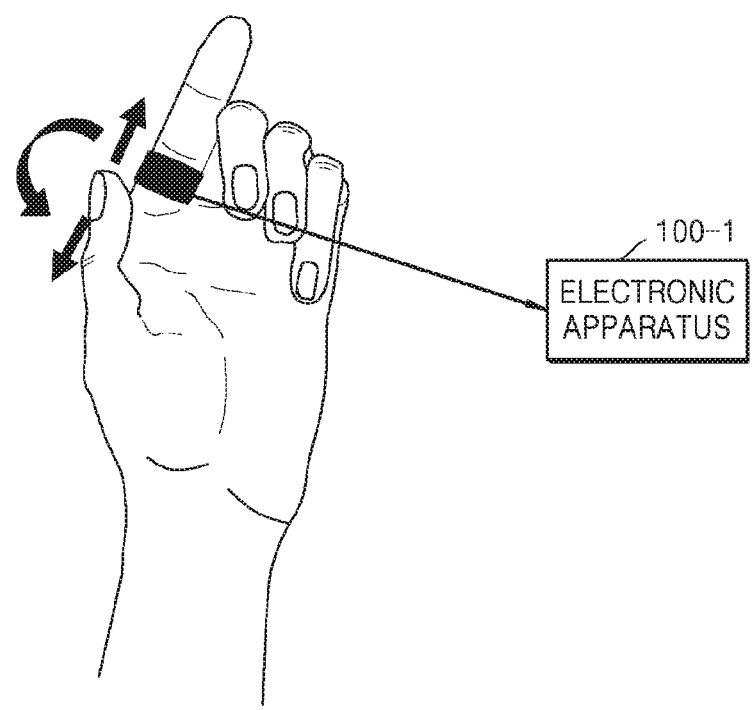
FIG. 47 illustrates a gesture of controlling an electronic apparatus that is a smart ring by using the frictional sound input, according to an embodiment.

FIG. 47 illustrates a gesture of controlling an electronic apparatus 100 that is a smart ring by using the frictional sound input, according to an embodiment.

According to the present embodiment, while wearing the smart ring, the user may generate a frictional sound input by rubbing or rotating the smart ring and thus may control the smart ring. According to an embodiment, the user may generate the frictional sound input by rubbing a finger, on which the smart ring is worn, a palm of a hand on which the smart ring is worn, a finger around the finger on which the smart ring is worn, or the like, thereby controlling the smart ring.

The smart ring according to an embodiment may receive the frictional sound input from the user and transmit the frictional sound input to another electronic apparatus (100-1, for example, a smart phone, a smart watch, smart glasses, a tablet PC, etc.). According to the present embodiment, the user may easily control the electronic apparatus 100-1 in a pocket or a bag by using the smart ring. Also, according to the present embodiment, the user may easily control the electronic apparatus 100-1 by using the smart ring, for example, a smart watch or smart glasses, which has a relatively small area assigned to the input device.

Figure 48:
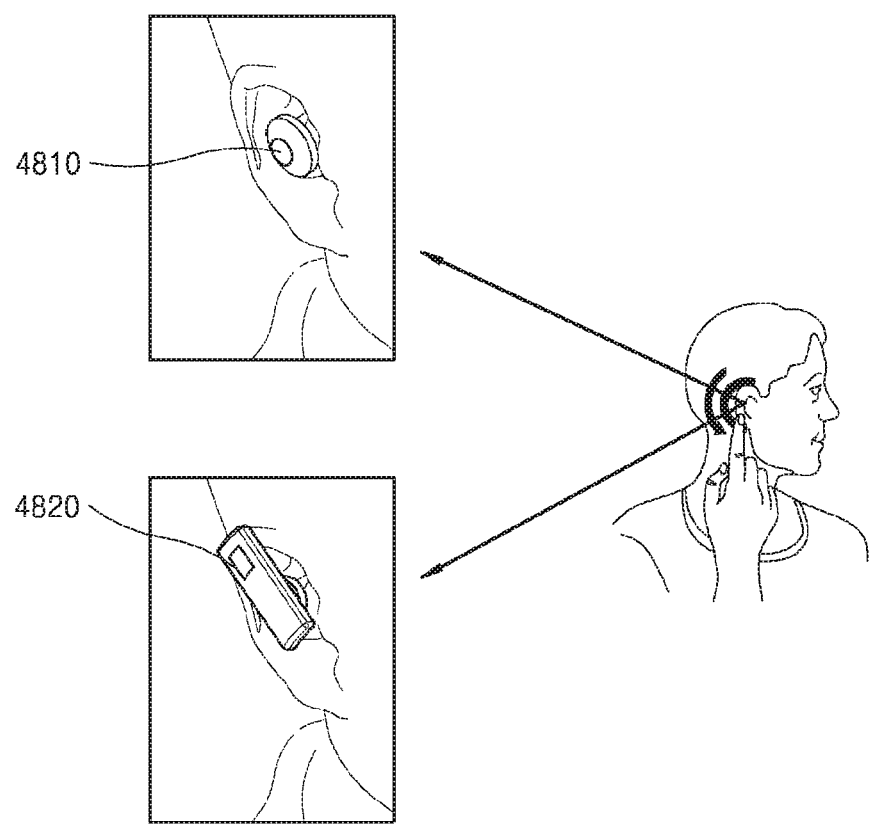
FIG. 48 illustrates a gesture of controlling an electronic apparatus that is an earphone by using a frictional sound input, according to an embodiment.

FIG. 48 illustrates a gesture of controlling an electronic apparatus 100 that is an earphone by using a frictional sound input, according to an embodiment.

According to the present embodiment, by using the frictional sound input, the user may control the electronic apparatus that is implemented as an in-ear earphone 4810, an over-the-ear earphone 4820, or the like. It is difficult to place an input device in the earphones illustrated in FIG. 48, due to spatial limitations. Moreover, in the case of wireless earphones, the wireless earphones are too small to include input devices. According to the present embodiment, the user generates the frictional sound input by rubbing, with a finger, skin around an auricle, an ear lobe, or an ear, and controls the electronic apparatus that is the earphone, by using the corresponding frictional sound input. According to an embodiment, by using the frictional user input, the user may control turning on or off, adjusting volume, turning on or off a wireless communication function, answering to incoming calls of the earphones, or the like. According to the present embodiment, the user may easily control small earphones.

Figure 49:
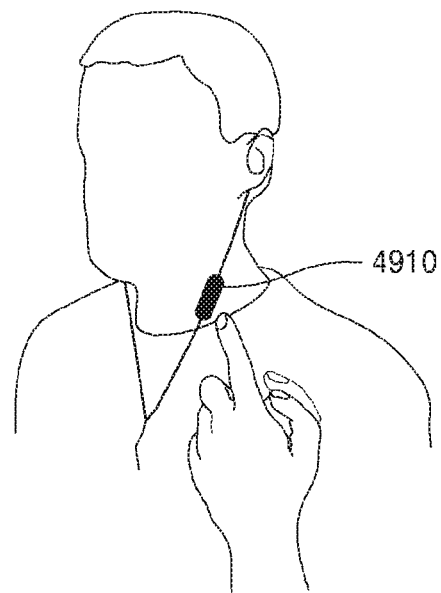
FIG. 49 illustrates a gesture of controlling an electronic apparatus that is earphones by using a frictional sound input, according to an embodiment.

FIG. 49 illustrates a gesture of controlling an electronic apparatus 100 that is earphones by using a frictional sound input, according to an embodiment.

According to the present embodiment, the user generates a frictional sound input by touching a manipulation device 4910 of the earphones including a microphone with a hand or placing the hand around the manipulation device 4910, thereby controlling the earphones. According to an embodiment, by using the frictional sound input, the user may perform control, for example, turning on or off the earphones, volume of the earphones, turning on or off a wireless communication function, answering to incoming calls, or the like. According to the present embodiment, since the user may manipulate the earphones without pressing a button on the manipulation device 4910, the user does not have to make an effort such as looking at the manipulation device 4910 to check the button thereof or finding the button.

Figure 50:
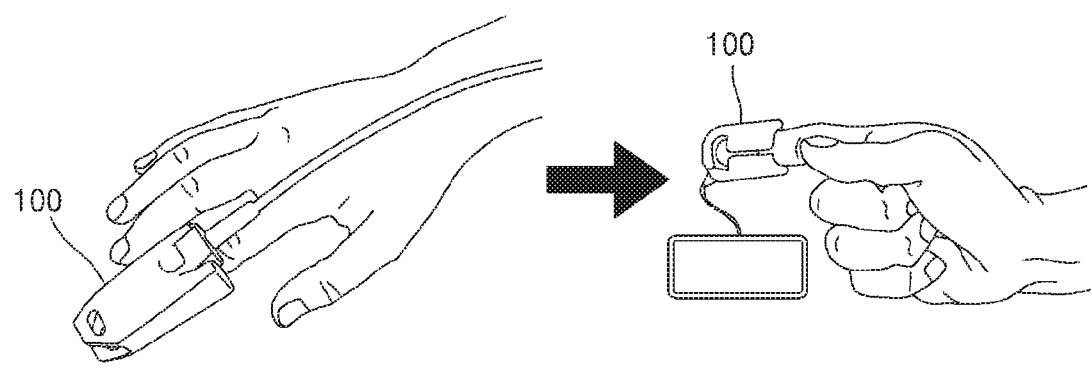
FIG. 50 illustrates a gesture of controlling an electronic apparatus that is a medical device by using a frictional sound input, according to an embodiment.

FIG. 50 illustrates a gesture of controlling an electronic apparatus 100 that is a medical device by using a frictional sound input, according to an embodiment.

According to the present embodiment, while wearing the electronic apparatus 100 that is the medical device, the user generates a frictional sound input by rubbing a skin tissue around a part, where the electronic apparatus 100 is placed, thereby controlling the electronic apparatus 100. For example, while wearing a photoplethysmogram (PPG) on a finger, the user may generate the frictional sound input by rubbing the finger and thus may control the PPG. According to an embodiment, the user may control the PPG to be turned on or off by using the frictional sound input.

Figure 51:
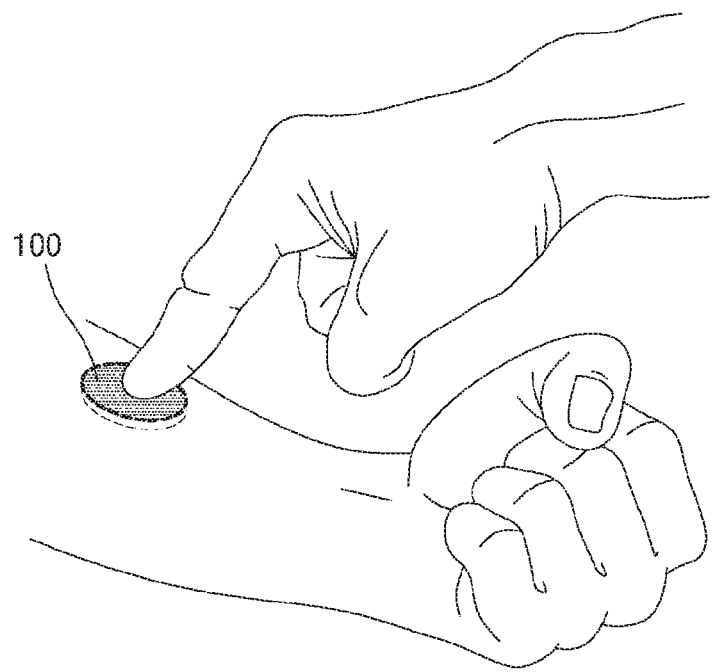
FIG. 51 illustrates a gesture of controlling an electronic apparatus that is an in-body chip by using a frictional sound input, according to an embodiment.

FIG. 51 illustrates a gesture of controlling an electronic apparatus 100 that is an in-body chip by using a frictional sound input, according to an embodiment.

According to the present embodiment, by using the frictional sound input, the user may control the electronic apparatus 100 that is the in-body chip which is implanted in the body of the user. For example, when the frictional sound input is generated while the user touches, with a finger, a tissue of skin where the in-body chip is implanted, the in-body chip may be controlled. The frictional sound input regarding the in-body chip may be defined as, for example, a gesture of vertically or horizontally rubbing skin at a location where the in-body chip is implanted, a gesture of tapping the skin, or the like. According to an embodiment, the electronic apparatus 100 that is the in-body chip may execute control commands such as a on or off command, a mode conversion command, a data reception/transmission command, and a command of measuring a certain biometric signal. According to the present embodiment, various commands may be input to the electronic apparatus 100 that is the in-body chip in which an input device is difficult to be implemented.

Figure 52:
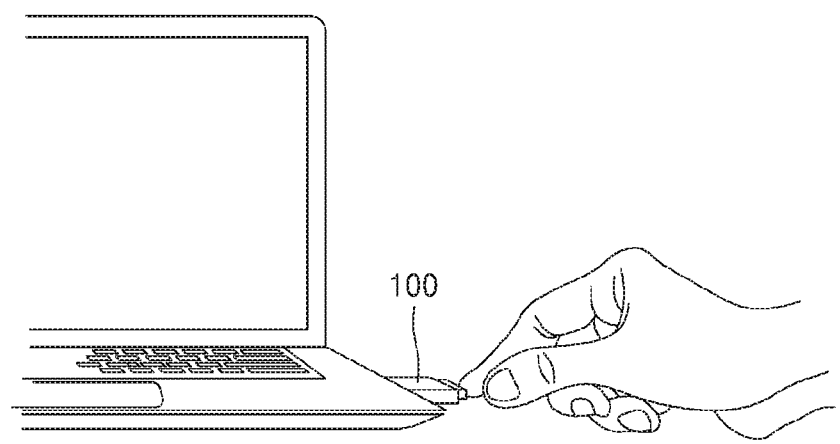
FIG. 52 illustrates a gesture of controlling an electronic apparatus that is an external storage device, according to an embodiment.

FIG. 52 illustrates a gesture of controlling an electronic apparatus 100 that is an external storage device, according to an embodiment.

According to the present embodiment, by using the frictional sound input, the user may control the electronic apparatus 100 that is the external storage device. For example, by using the frictional sound input, the user may access the external storage device by performing user authentication. According to the present embodiment, even when security problems occur on a main electronic apparatus (e.g., a laptop, etc.) connected to the external storage device, security of the external storage device may be maintained.

According to an embodiment, the electronic apparatus 100 may be of an input device type such as a pen, a keyboard, a mouse, a touch pad, or a track ball, may receive the frictional sound input, and may execute a control command. The pen may include, for example, a stylus pen, a light pen, or the like. The keyboard may include various types of keyboards such as a mechanical keyboard, a touchscreen keyboard, and a touch sensor keyboard. The mouse includes a mechanical mouse or a touch mouse. The touch pad includes an internal or external touch pad on which a mouse cursor may move.

According to an embodiment, the user may use a frictional sound input of rubbing a thumb with an index finger while holding a pen and may transmit, to the electronic apparatus 100, a control command such as an Undo input of cancelling what is input by the pen, or a Redo input of reversing a previous input. According to an embodiment, the user may use the frictional sound input, which is defined by the number of times that part of a pen or a body part is rubbed, as an authentication control command of activating the pen.

According to an embodiment, the user may perform a special function of the keyboard by rubbing a finger or the back of a hand while putting a finger on the keyboard. The special function includes, for example, keyboard activation, a function key operation, language conversion, a shortcut key operation, or the like.

According to an embodiment, various frictional sound inputs, which are executed while a body part is in contact with a mouse, a touch pad, a track ball, etc., may be defined and used.

Figure 53:
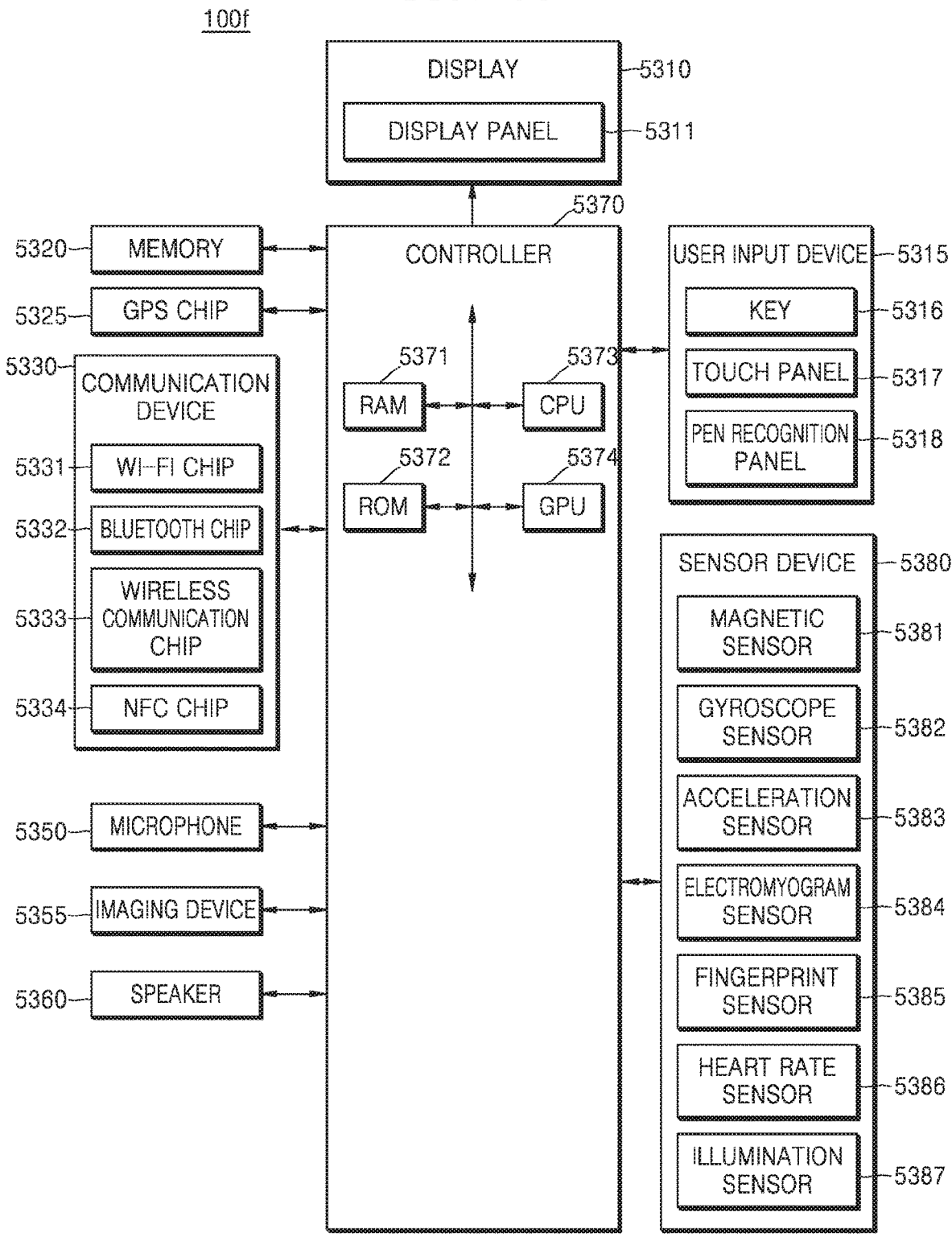
FIG. 53 is a block diagram of a structure of an electronic apparatus, according to an embodiment, and the structure of FIG. 53 may be applied to electronic apparatuses according to embodiments.

FIG. 53 is a block diagram of a structure of an electronic apparatus 100f, according to an embodiment. The structure of FIG. 53 may be applied to the electronic apparatuses 100, 100a, 100b, 100c, 100d, and 100e according to one or more embodiments.

The electronic apparatus 100f according to the present embodiment may be implemented in any of various forms such as wearable devices, for example, a mobile phone, a tablet PC, a PDA, an MP3 player, a kiosk, a digital photo frame, a navigation device, a digital TV, a wrist watch, a Head-Mounted Display (HMD), and the like.

Referring to FIG. 53, the electronic apparatus 100f may include a display 5310, a user input device 5315, a memory 5320, a Global Positioning System (GPS) chip 5325, a communication device 5330, a microphone 5350, an imaging device 5355, a speaker 5360, a controller 5370, and a sensor device 5380.

The display 5310 may include a display panel 5311 and a controller (not illustrated) for controlling the display panel 5311. The display panel 5311 may be implemented in any of various forms such as a Liquid Crystal Display (LCD), an Organic Light-emitting diode (OLED) display, an Active-Matrix Organic Light-emitting Diode (AM-OLED) display, and a Plasma Display Panel (PDP). The display panel 5311 may be flexible, transparent, or wearable. The display 5310 may be combined with a touch panel 5347 of the user input device 5345 and thus may be provided as a touch screen (not illustrated). For example, the touch screen (not illustrated) may include an integral-type module in which the display panel 5311 and the touch panel 5347 form a stack structure.

The memory 5320 may include at least one of an internal memory (not illustrated) and an external memory (not illustrated).

The internal memory may include, for example, at least one of volatile memory (e.g., Dynamic Random Access Memory (DRAM), Static RAM (SRAM), Synchronous Dynamic RAM (SDRAM), etc.), non-volatile memory (e.g., One Time Programmable Read Only Memory (OTPROM), Programmable ROM (PROM), Erasable and Programmable ROM (EPROM), Electrically Erasable and Programmable ROM (EEPROM), Mask ROM, Flash ROM, etc.), hard disk drive (HDD), and solid state drive (SSD). According to an embodiment, the controller 5370 may load, on the volatile memory, commands or data received from at least one of the non-volatile memory and other components and may process the commands or data. Also, the controller 5370 may store, in the non-volatile memory, data received from the other components or generated.

The external memory may include, for example, at least one of Compact Flash (CF), Secure Digital (SD), Micro Secure Digital (Micro-SD), Mini Secure Digital (Mini-SD), extreme Digital (xD), and a memory stick.

The memory 5320 may store various programs and data used for the operation of the electronic apparatus 100f. For example, the memory 5320 may temporarily or semi-permanently store at least some pieces of content to be displayed on a lock screen.

The controller 5370 may control the display 5310 to display thereon the at least some pieces of the content stored in the memory 5320. In other words, the controller 5370 may display, on the display 5310, part of the content stored in the memory 5320. Alternatively, when a user gesture is made on a portion of the display 5310, the controller 5370 may perform a control operation corresponding to the user gesture.

The controller 5370 may include at least one of RAM 5371, ROM 5372, a central processing unit (CPU) 5373, a graphics processing unit (GPU) 5374, and a bus 5375. The RAM 5371, the ROM 5372, the CPU 5373, the GPU 5374, etc. may be connected to each other via the bus 5375.

The CPU 5373 accesses the memory 5320 and performs booting by using an operating system (O/S) stored in the memory 5320. The CPU 5373 executes various operations by using the programs, the content, the data, etc. which are stored in the memory 5320. Also, the CPU 5373 may process audio data included in the content received through a communication device 5330 or the content stored in the memory 5320.

The CPU 5373 may perform various processes, for example, decoding, amplification, noise filtering, and the like, on the audio data. The CPU 5373 may process audio signals according to one or more embodiments.

In the ROM 5372, sets of commands, etc. for system booting are stored. For example, when a turn-on command is input and power is applied to the electronic apparatus 100f, the CPU 5373 may copy, to the RAM 5371, the O/S stored in the memory 5320 according to the commands stored in the ROM 5372 and may execute the O/S, thus booting the system. When the booting is completed, the CPU 5373 may copy, to the RAM 5371, the programs stored in the memory 5320 and executes the programs coped to the RAM 5371, thereby performing various operations.

When booting of the electronic apparatus 100f is completed, the GPU 5374 may display a UI screen on an area of the display 5310. In particular, the GPU 5374 may generate a screen on which an electronic document including diverse objects such as content, icons, and a menu is displayed. The GPU 5374 calculates attribute values such as a value of coordinates on which each object is to be displayed, a shape, a size, and a color of each object, according to a screen layout. The GPU 5374 may generate screens having various layouts including the objects, based on the calculated attribute values. The screens generated by the GPU 5374 are provided to the display 5310 and may be displayed on respective areas of the display 5310.

Also, the GPU 5374 may process video data included in the content received through the communication device 5330 or the content stored in the memory 5320. The GPU 5374 may perform various image processes, for example, decoding, scaling, noise filtering, frame rate conversion, a resolution change, etc., on the video data.

The GPS chip 5325 may receive a GPS signal from a GPS satellite and may calculate a current location of the electronic apparatus 100f. When a navigation program is used or a current location of the user is required, the controller 5370 may use the GPS chip 5325 to calculate a location of the user.

The communication device 5330 may communicate with various types of external devices according to different communication methods. The communication device 5330 may include at least one of a Wi-Fi chip 5331, a Bluetooth chip 5332, a wireless communication chip 5333, and a Near Field Communication (NFC) chip 5334. The controller 5370 may communicate with various external devices by using the communication device 5330.

The Wi-Fi chip 5331 and the Bluetooth chip 5332 may perform communication in a Wi-Fi manner and a Bluetooth manner, respectively. When the Wi-Fi chip 5331 or the Bluetooth chip 5332 is used, connection information such as a service set identifier (SSID) or a session key is received/transmitted first, and then communication connection is performed based on the connection information to receive/transmit various pieces of information.

The wireless communication chip 5333 denotes a chip for performing communication according to communication protocols such as IEEE, ZigBee, $3^{rd}$ (3G) generation, $3^{rd}$ Generation Partnership Project (3GPP), and Long Term Evolution (LTE). The NFC chip 5334 denotes a chip operating in an NFC manner using a frequency band of 13.56 MHz selected from among various RF-ID frequency bands such as frequency bands of 135 kHz, 13.56 MHz, 433 MHz, 860 MHz to 960 MHz, and 2.45 GHz.

The speaker 5360 may output audio data generated on the CPU 5373.

The user input device 5315 may receive various commands from the user. The user input device 5315 may include at least one of a key 5316, a touch panel 5317, and a pen recognition panel 5318.

The key 5316 may include different types of keys such as mechanical buttons and wheels which are formed on regions, for example, a front part, a side part, a rear part, etc., of an exterior of a body of the electronic apparatus 100f.

The touch panel 5317 may detect a touch input of the user and may output a touch event value corresponding to the detected touch signal. When the touch panel 5317 and the display panel 5311 are combined with each other and form a touch screen (not illustrated), the touch screen may be embodied as an electrostatic touch sensor, a resistive touch sensor, a piezoelectric touch sensor, or the like. In the electrostatic touch sensor, when a body part of the user is in contact with a touch screen surface, micro-electricity generated by the body part is detected using coated dielectric substances on the touch screen surface, and thus touch coordinates are calculated. The resistive touch sensor includes two electrode plates embedded in a touch screen, and when the user touches a screen, the resistive touch sensor detects a current flowing because portions of top and bottom plates, which are touched by the user, contact each other, and thus touch coordinates are calculated. The touch events generated on the touch screen may be usually generated by fingers of the user, but may also be generated by conductive materials capable of causing a change in capacitance in the touch screen.

When the user uses a touch pen (e.g., a stylus pen, a digitizer pen, etc.), the pen recognition panel 5318 may detect a proximity input or a touch input of the pen and may output a detected pen proximity event or a detected pen touch event. The pen recognition panel 5318 may be implemented by, for example, an Electro Magnetic Resonance (EMR) and may detect a touch or proximity input according to an intensity change in an electromagnetic field that is caused due to the proximity or touch of the pen. In detail, the pen recognition panel 5318 may include a magnetic induction coil sensor (not illustrated) having a grid structure and an electronic signal processor (not illustrated) sequentially providing respective loop coils of the magnetic induction coil sensor with alternating current (AC) signals having certain frequencies. When a pen including a resonance circuit exists in a vicinity of the loop coils of the pen recognition panel 5318, a magnetic field transmitted from the loop coils generates a current based on mutual electromagnetic induction of the resonance circuit in the pen. Based on the current, an induction magnetic field is generated from coils forming the resonance circuit of the pen, and the pen recognition panel 5318 detects the induction magnetic field from the loop coils that are in a signal reception state, thus detecting a proximity location or a touch location of the pen. The pen recognition panel 5318 may have a certain area at the bottom of the display panel 5311, for example, an area that may cover a display area of the display panel 5311.

The microphone 5350 may receive user's voice or sound of a guitar and may convert the received user's voice or sound into audio data. The controller 5370 may use the user's voice received via the microphone 5350 during a call operation or may convert the user's voice into the audio data and store the audio data in the memory 5320.

The imaging device 5355 may capture a still image or a moving image according to the control of the user. There may be multiple imaging devices 5355 such as a front-facing camera and a rear-facing camera.

When the imaging device 5355 and the microphone 5350 are included, the controller 5370 may perform control operations according to the user's voice received via the microphone 5350 or a user's motion recognized by the imaging device 5355. For example, the electronic apparatus 100f may operate in a motion control mode or a voice control mode. When the electronic apparatus 100f operates in a motion control mode, the controller 5370 may activate the imaging device 5355 to capture an image of the user, trace a change in the user's motion, and perform a corresponding control operation. When the electronic apparatus 100f operates in a voice control mode, the controller 5370 may analyze the user's voice input via the microphone 5350 and may operate in a voice recognition mode in which a control operation is performed according to the analysed user's voice.

According to an embodiment, the controller 5370 may use an image signal detected by the imaging device 5355 and a frictional sound input received from the microphone 5350 and may control the electronic apparatus 100f. For example, the controller 5370 may use a combination of a user's motion, which is recognized from the image signal detected by the imaging device 5355, and the frictional sound input received from the microphone 5350 to retrieve a corresponding control command and may execute the control command.

The sensor device 5380 may include various combinations of sensors and may include at least one of a magnetic sensor 5381, a gyroscope sensor 5382, an acceleration sensor 5383, an electromyogram sensor 5384, a fingerprint sensor 5385, a heart rate sensor 5386, and an illumination sensor 5387, or a combination thereof.

Although not illustrated in FIG. 53, according to embodiments, the electronic apparatus 100f may further include a universal serial bus (USB) port to which a USB connector may be connected, various external input ports to which external terminals such as a headset, a mouse, and a Local Area Network (LAN) are connected, a Digital Multimedia Broadcasting (DMB) chip for receiving and processing DMB signals, various sensors, and the like.

Names of the aforementioned components of the electronic apparatus 100f may be changed. Also, the electronic apparatus 100f according to the present embodiment may include at least one of the aforementioned components. Some of the aforementioned components may not be included in the electronic apparatus 100f, or additional components may be further included therein.

The processors 120a to 120e may correspond to the controller 5370. The microphone 110 may correspond to the microphone 5350 of FIG. 53. The ADC 910 may correspond to the CPU 5373. The output device 920 may correspond to the display 5310 and the speaker 5360. The storage 930 may correspond to the memory 5320. The motion sensor 2310 may correspond to the gyroscope sensor 5382 or the acceleration sensor 5383. The electromyogram sensor 2710 or the fingerprint sensor 3010 may correspond to the sensor device 5380.

One or more embodiments may be implemented as a recording medium including commands executable by a computer such as a program module. A non-transitory computer-readable recording medium may be an arbitrary medium accessible by a computer and may include volatile and non-volatile media and removable and non-removable media. Also, the non-transitory computer-readable recording medium may include a computer storage medium and a communication medium. The computer storage medium includes the volatile and non-volatile media and the removable and non-removable media that are implemented by an arbitrary method or technology for storing computer-readable commands, data structures, program modules, or information such as other data. The communication medium generally includes computer-readable commands, data structures, program modules, other data including modulated data signals such as carrier waves, or other transmission mechanisms, and includes an arbitrary information transmission medium.

The one or more embodiments are merely examples, and one of ordinary skill in the art to which the present disclosure pertains may understand that the disclosure may be embodied in many different forms without changing the spirit or essential features of the disclosure. Thus, the one or more embodiments are illustrative and non-restrictive in all aspects. For example, components that are described as a single component may be distributed, and components that are described as distributed component may be combined.

While the present disclosure has been particularly shown and described with reference to embodiments thereof, it will be understood by those of ordinary skill in the art that various changes in form and details may be made therein without departing from the spirit and scope of the present disclosure as defined by the following claims.

The invention claimed is:

1. An electronic apparatus comprising:
a microphone;
a fingerprint sensor; and
a processor, coupled to the microphone and the fingerprint sensor, and configured to:
control the microphone to receive an audio signal,
control the fingerprint sensor to detect a fingerprint,
detect frictional sound from the audio signal,
determine a frictional property by analyzing a characteristic of the detected frictional sound, and
execute a control command corresponding to the frictional property,
wherein the frictional sound comprises a sound generated by friction between a body part and a tangible object,
wherein the frictional property comprises at least one of a characteristic of the friction between the body part and the tangible object or a characteristic of the body part, and
wherein, based on receiving the audio signal corresponding to the detected frictional sound within a reference time range from a time point when the fingerprint is detected, the processor determines the control command based on a combination of the frictional property and the detected fingerprint.

2. The electronic apparatus of claim 1, wherein the processor is further configured to detect the frictional sound based on a change in amplitude of the audio signal.

3. The electronic apparatus of claim 1, further comprising:
a storage configured to store a control list of control commands according to frictional properties,
wherein the processor is further configured to select the control command corresponding to the frictional property from the control list.

4. The electronic apparatus of claim 1, wherein the processor is further configured to determine the frictional property based on a frequency distribution of the frictional sound.

5. The electronic apparatus of claim 1, wherein the tangible object is the electronic apparatus.

6. The electronic apparatus of claim 1, further comprising:
a motion sensor,
wherein the processor is further configured to:
control the motion sensor to detect a motion of the electronic apparatus and provide a detection value corresponding to the detected motion, and
execute an operation corresponding to a combination of the detected motion with the frictional sound.

7. The electronic apparatus of claim 1, wherein the processor is further configured to determine the frictional property based on data that is within a frequency range from about 20 Hz to about 20 KHz.

8. The electronic apparatus of claim 1, wherein the processor is further configured to perform user authentication by using the frictional sound.

9. The electronic apparatus of claim 1, further comprising:
an electromyogram sensor,
wherein the processor is further configured to:
control the electromyogram sensor to configured to detect a movement of a muscle and provide a detection value corresponding to the detected movement of the muscle, and
determine the movement of the muscle based on the detection value, and
wherein the control command corresponding to the frictional property corresponds to a combination of the frictional property and the determined movement of the muscle.

10. A method of controlling an electronic apparatus, the method comprising:
receiving an audio signal;
detecting a fingerprint;
detecting frictional sound from the audio signal;
determining a frictional property by analyzing a characteristic of the detected frictional sound; and
executing a control command corresponding to the frictional property,
wherein the frictional sound comprises a sound generated by friction between a body part and a tangible object,
wherein the frictional property comprises at least one of a characteristic of the friction between the body part and the tangible object or a characteristic of the body part, and
wherein the method further comprises, based on receiving the audio signal corresponding to the detected frictional sound within a reference time range from a time point when the fingerprint is detected, determining the control command based on a combination of the frictional property and the detected fingerprint.

11. The method of claim 10, wherein the detecting of the frictional sound comprises detecting the frictional sound based on a change in amplitude of the audio signal.

12. The method of claim 10, further comprising selecting the control command corresponding to the determined frictional property from a control list of control commands according to frictional properties.

13. The method of claim 10, wherein the determining of the frictional property comprises determining the frictional property based on a frequency distribution of the frictional sound.

14. A non-transitory computer-readable recording medium having recorded thereon a program code which, when executed by a computer, performs a method of controlling an electronic apparatus, the method including:
receiving an audio signal;
detecting a fingerprint;
detecting frictional sound from the audio signal;
determining a frictional property by analyzing a characteristic of the detected frictional sound; and
executing a control command corresponding to the frictional property,
wherein the frictional sound comprises a sound generated by friction between a body part and a tangible object,
wherein the frictional property comprises at least one of a characteristic of the friction between the body part and the tangible object or a characteristic of the body part, and
wherein the method further comprises, based on receiving the audio signal corresponding to the detected frictional sound within a reference time range from a time point when the fingerprint is detected, determining the control command based on a combination of the frictional property and the detected fingerprint.

\* \* \* \* \*